United States Patent
Topliss et al.

(10) Patent No.: US 9,641,733 B1
(45) Date of Patent: May 2, 2017

(54) MINIATURE CAMERA PLURAL IMAGE SENSOR ARRANGEMENTS

(71) Applicant: Apple Inc., Cupertino, CA (US)

(72) Inventors: Richard J. Topliss, Campbell, CA (US); Richard H. Tsai, Cupertino, CA (US); Ning Y. Chan, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 14/477,604

(22) Filed: Sep. 4, 2014

Related U.S. Application Data

(63) Continuation of application No. 14/065,110, filed on Oct. 28, 2013, now abandoned.

(51) Int. Cl.
*H04N 5/335* (2011.01)
*H04N 9/04* (2006.01)
*H01L 31/0232* (2014.01)
*H04N 5/225* (2006.01)

(52) U.S. Cl.
CPC ................................. *H04N 5/2254* (2013.01)

(58) Field of Classification Search
CPC G02B 27/0172; G02B 27/145; G02B 27/283; G02B 27/0101; G02B 6/00; G02B 27/149; G02B 21/361; G02B 27/1026; G02B 27/143; G02B 5/10; G02B 5/2254; G02B 5/23212; G03B 21/208; G03B 33/12; H04N 5/2254; H04N 5/23212

USPC ................ 348/294; 257/432; 250/208.1
See application file for complete search history.

(56) References Cited

U.S. PATENT DOCUMENTS

| | | | |
|---|---|---|---|
| 6,788,338 | B1 | 9/2004 | Dinev et al. |
| 8,976,291 | B2* | 3/2015 | Chen ............... H04N 5/2253 348/335 |
| 2010/0073499 | A1 | 3/2010 | Gere |
| 2010/0214402 | A1* | 8/2010 | Schute ............ G02B 21/361 348/77 |
| 2012/0105594 | A1 | 5/2012 | You et al. |
| 2014/0092282 | A1* | 4/2014 | Morishita ........... G01J 3/26 348/262 |
| 2014/0300718 | A1 | 10/2014 | Krattiger et al. |
| 2014/0305687 | A1* | 10/2014 | Matsuzawa ........ H03H 9/0542 174/260 |

* cited by examiner

*Primary Examiner* — Trung Diep
(74) *Attorney, Agent, or Firm* — Robert C. Kowert; Meyertons, Hood, Kivlin, Kowert & Goetzel, P.C.

(57) ABSTRACT

In some embodiments, a camera includes a first image sensor attached to a first ceramic substrate, a second image sensor attached to a second ceramic substrate, and a lens system including a set of lens elements serving both the first image sensor and the second image sensor, and a color-splitting component along an optical path between the lens system and the image sensors. The color-splitting component separates the light into a first set of wavelengths directed to the first image sensor and a second set of wavelengths directed to the second image sensor.

20 Claims, 32 Drawing Sheets

MINIATURE CAMERA PLURAL IMAGE SENSOR ARRANGEMENTS

This application is a continuation of U.S. patent application Ser. No. 14/065,110, filed Oct. 28, 2013, which is hereby incorporated by reference in it's entirety.

BACKGROUND

Technical Field

This disclosure relates generally to cameras, and, more specifically, to light sensor arrangement in cameras.

Description of the Related Art

Miniature cameras are typically used in mobile devices such as cellphones and other multifunction devices. In such devices, space is a premium and every effort is made to minimize the camera size. A zoom lens is a lens where the lens elements can be moved relative to one another to change the focal length of the lens. In doing so, this changes the field of view of the lens. In addition, such a lens is most typically required to adjust focus for different object distances. Many different configurations of zoom lens are possible. However, for a typical optical zoom lens, there are at least two lens groups that move independently of each other along the optical axis relative to the image sensor, but in a relational manner to each other. There are additionally typically further lens groups that remain stationary relative to the image sensors.

For conventional image sensors, a series of color filters are applied over the light sensitive pixels (for example in a Bayer pattern), and hence the majority of light is absorbed by the color filters and lost.

SUMMARY OF EMBODIMENTS

In some embodiments, a camera includes a first image sensor attached to a first ceramic substrate, a second image sensor attached to a second ceramic substrate, and a lens system including a set of lens elements serving both the first image sensor and the second image sensor, and a color-splitting component along an optical path between the lens system and the image sensors. The color-splitting component separates the light into a first set of wavelengths directed to the first image sensor and a second set of wavelengths directed to the second image sensor.

Figure 1:
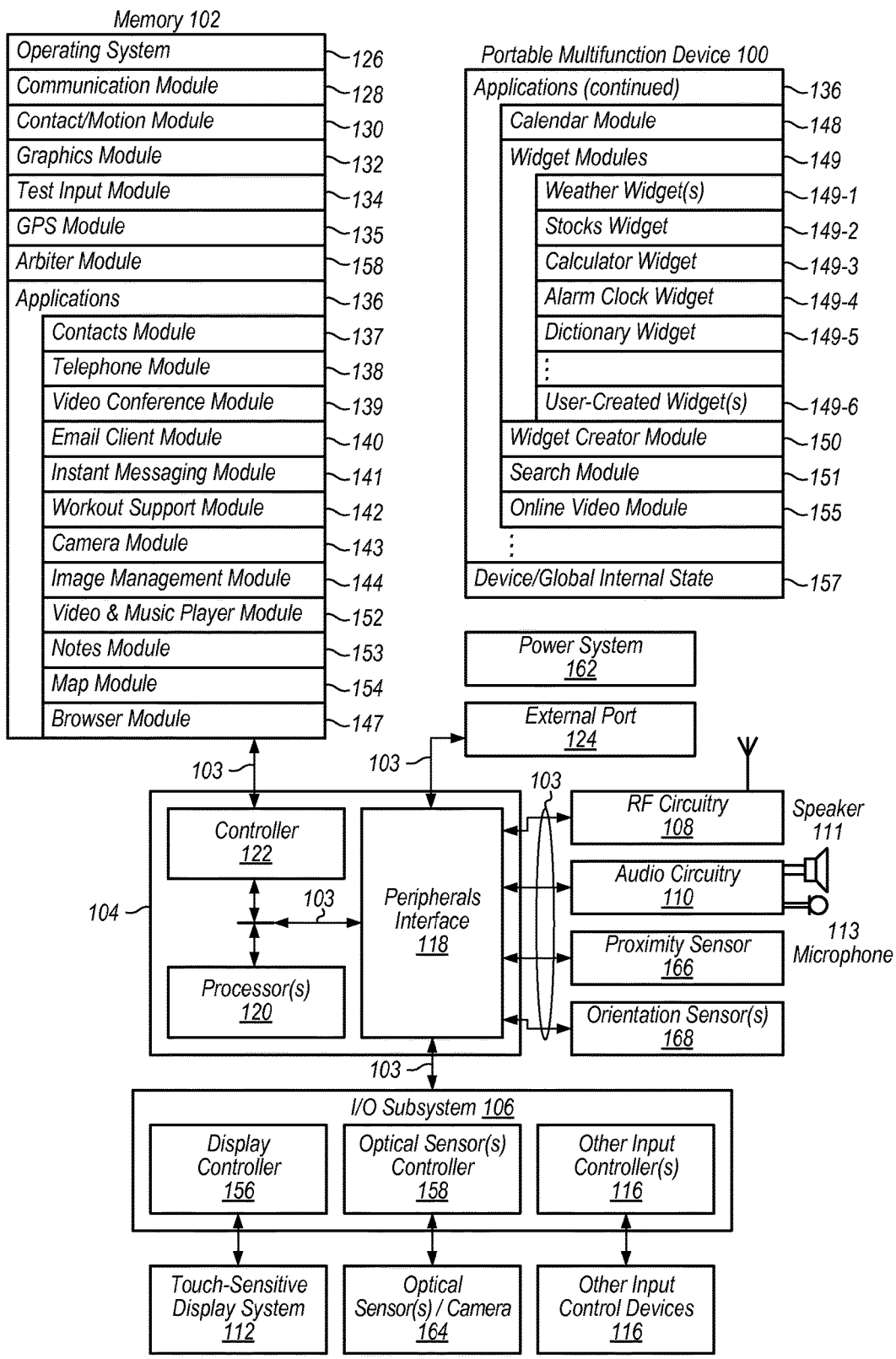
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

In some embodiments, a camera includes a first image sensor attached to a first ceramic substrate, a second image sensor attached to a second ceramic substrate, and a lens system including a set of lens elements serving both the first image sensor and the second image sensor, and a color-splitting component along an optical path between the lens system and the image sensors. The color-splitting component separates the light into a first set of wavelengths directed to the first image sensor and a second set of wavelengths directed to the second image sensor.

In some embodiments, the first set of wavelengths comprises a first range of wavelengths, and the second set of wavelengths comprises a second range of wavelengths above the first range of wavelengths and a third range of wavelengths below the first range of wavelengths. Some embodiments further include a color filter affixed between the second image sensor and the color splitting component. In some embodiments, the color filter includes a checkerboard pattern of red and blue color filter elements over a pixel sensor array of the image sensor.

In some embodiments, the color-splitting component comprises a first optically transparent component bonded to a first surface of a selectively-reflective component, and a second optically transparent component bonded to a second surface of the selectively-reflective film opposite the first surface of the selectively reflective component. The selectively-reflective component reflects or transmits light depending on the wavelength of the light.

In some embodiments, the color-splitting component has a rectangular cross-section. The first optically transparent component has a triangular cross-section, and the second optically transparent component has a triangular cross-section. In some embodiments, the first set of wavelengths includes a first range of green wavelengths, and the second set of wavelengths includes a second range of red wavelengths above the first range of wavelengths and a third range of blue wavelengths below the first range of wavelengths.

Some embodiments include a camera that includes a ceramic substrate, an image sensor flip-chip bonded to the ceramic substrate, and a plurality of electrical connection pads for connecting to a flexible printed circuit. The plurality of connection pads is located on a first planar external surface of the ceramic substrate, and the plurality of connection pads is located on a same side of an edge of the image sensor. In some embodiments a plurality of bonding pads for flip-chip bonding the image sensor to the ceramic substrate is located on the first planar external surface of the ceramic substrate.

In some embodiments, the ceramic substrate has one or more castellations cut into two opposite sides of a second planar external surface of the ceramic substrate. In some embodiments, the ceramic substrate has one or more castellations cut into two opposite sides of a second planar external surface of the ceramic substrate, and the second planar external surface of the ceramic substrate is on an opposite side of the ceramic substrate from the first planar external surface of the ceramic substrate.

In some embodiments, the ceramic substrate has a plurality of castellations cut into two opposite sides of a second planar external surface of the ceramic substrate, and each castellation of the plurality of castellations is offset from another of the plurality of castellations so that a second similar ceramic substrate mounted orthogonally to the ceramic substrate in alignment with a color-splitting component can articulate to lock in place relative to one another and the color-splitting component.

In some embodiments, the ceramic substrate has a plurality of castellations cut into two opposite sides of a second planar external surface of the ceramic substrate, and each castellation of the plurality of castellations is offset from another of the plurality of castellations.

Some embodiments further include a lens system including a plurality of lens elements serving both the first image sensor and a second image sensor, and a color-splitting component along an optical path between the lens system and the image sensors. The color-splitting component separates the light into a first set of wavelengths directed to the first image sensor and a second set of wavelengths directed to the second image sensor.

Some embodiments include a camera component, including a first image sensor attached to a first ceramic substrate, a second image sensor attached to a second ceramic substrate, and a color-splitting component along an optical path between a lens system and the image sensors. In some embodiments, the color-splitting component separates the light into a first set of wavelengths directed to the first image sensor and a second set of wavelengths directed to the second image sensor.

In some embodiments, the first set of wavelengths includes a first range of wavelengths, and the second set of wavelengths includes a second range of wavelengths above the first range of wavelengths and a third range of wavelengths below the first range of wavelengths.

In some embodiments, the first ceramic substrate comprises a plurality of electrical connection pads for connecting to a flexible printed circuit, and the plurality of connection pads is located on a first planar external surface of the ceramic substrate. The plurality of connection pads is located on a same side of an edge of the image sensor. In some embodiments, a plurality of bonding pads for flip-chip bonding the image sensor to the first ceramic substrate is located on the first planar external surface of the first ceramic substrate. In some embodiments, the first ceramic substrate has a plurality of castellations cut into two opposite sides of a second planar external surface of the first ceramic substrate, and each castellation of the plurality of castellations is offset from another of the plurality of castellations so that the second similar ceramic substrate mounted orthogonally to the ceramic substrate in alignment with a color-splitting component can articulate to lock in place relative to one another and the color-splitting component. Some embodiments further include a lens system comprising a plurality of lens elements serving both the first image sensor and a second image sensor.

Some embodiments include an image sensor device configuration for a miniature camera, including two or more separate image sensors. In some embodiments, the image sensor device configuration further includes a lens typically made up of multiple lens elements that serves both image sensors. In some embodiments, the image sensor device configuration further includes a color-splitting component in the optical path between the lens elements and the image sensors, which splits the light into two or more light groups of different wavelength composition, directing one set to each image sensor.

In some embodiments, one wavelength set includes substantially green visible light and the second set is made up of longer wavelengths in the red range, and shorter wavelengths in the blue range.

In some embodiments, the image sensor device configuration further includes an image sensor for receiving red and blue light that has a checkerboard pattern of red and blue color filters over the pixel array. In some embodiments, the image sensor device configuration further includes an image sensor for receiving green light has that has no color filter.

In some embodiments, the image sensor device configuration further includes a colorsplitting component that has a square cross-section, and is fabricated from two optically transparent components with right angled triangular cross-section that are bonded together to for the square cross-section, wherein a semi-reflective component exists at the bonding interface between the components with triangular cross-section. In some embodiments, there is at least one coating that forces a selectively reflective surface based on the wavelength of light, which selectively directs the light to the different image sensors based on wavelength.

Some embodiments include an image sensor configuration in a miniature camera, in which an image sensor is flip-chip bonded to a ceramic substrate. In some embodiments, the ceramic has a further group of electrical connection pads for connecting to a flexible printed circuit (FPC), that are all located to one side of the image sensor.

In some embodiments, the group of pads for connection to the FPC and the pads for flip-chip bonding to the image sensor reside on the same external planar surface of the ceramic substrate.

In some embodiments, the ceramic substrate has castellations cut into two opposite sides of the planar surface on the opposite side of the ceramic from the image sensor flip-chip pads. In some embodiments, the castellations are offset from one another so that similar substrates mounted orthogonally to each other on the color-splitting component can mesh which each other to reduce the camera size.

Some embodiments include a miniature camera. In some embodiments, the camera includes a single stack of lens elements, with at least two image sensors receiving light from the same lens stack. In some embodiments, a means, such as a prism, is provided to split the light into different wavelength portions, directing one portion to each image sensor. In some embodiments, each image sensor is packaged by flip-chip bonding to a substrate, and each substrate is electrically connected to a flexible printed circuit.

In some embodiments, the substrate has electrical contact pads to the flexible printed circuit on two opposing sides of the substrate.

In some embodiments, all of the image sensors and substrates are identical. In some embodiments, the substrates are predominantly fabricated from low thermal expansion ceramic materials with embedded conductive tracks.

In some embodiments the means for splitting the light into different wavelengths is a cube with two embedded surfaces that are orthogonal to each other and each angled at 45 degrees to the same four surfaces of the cube, each surface extending from one edge of the cube to the diagonally opposite edge, such that one surface substantially reflects one portion of wavelengths in the visible region whilst allowing other wavelengths to substantially pass through, and the other surface substantially reflects a different portion of wavelengths in the visible region, while substantially allowing other wavelengths to pass through. In some embodiments, there is a remaining portion of wavelengths in the visible region that pass through both surfaces.

In some embodiments, there are three image sensor substrates, each mounted orthogonally to one face of the light splitting cube. In some embodiments, each ceramic substrate is actively aligned to the cube to ensure the pixel array of the image sensor is appropriately positioned relative to the cube, and each is bonded to the cube substantially all around the aperture to prevent dust ingress, possibly allowing for a very small region to allow for pressure equalization.

In some embodiments, there are two image sensor substrates, mounted at a right angle to one another along faces of the light splitting cube. In some embodiments, each ceramic substrate is actively aligned to the cube to ensure the pixel array of the image sensor is appropriately positioned relative to the cube, and each is bonded to the cube substantially all around the aperture to prevent dust ingress, possibly allowing for a very small region to allow for pressure equalization.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video module and a music module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, arbiter module 158 negotiates control of a shared audio or visual resource of an automobile. A request for control of a shared audio or visual resource of the vehicle is received at arbiter module 158. Arbiter module 158 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 100) temporarily communicating with the vehicle. New state information regarding ownership of the shared audio or visual resource is determined by arbiter module 158 based at least in part on the request for control and the ownership transition conditions. The new state information indicates which of the processes controls output of the shared audio or visual resource of the vehicle. New ownership transition conditions of the shared audio or visual resource are determined by arbiter module 158 and communicated to a controller interface of the shared audio or visual resource.

In conjunction with RF circuitry 108, audio circuitry 110, speaker 111, microphone 113, touch screen 112, display controller 156, optical sensor 164, arbiter module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
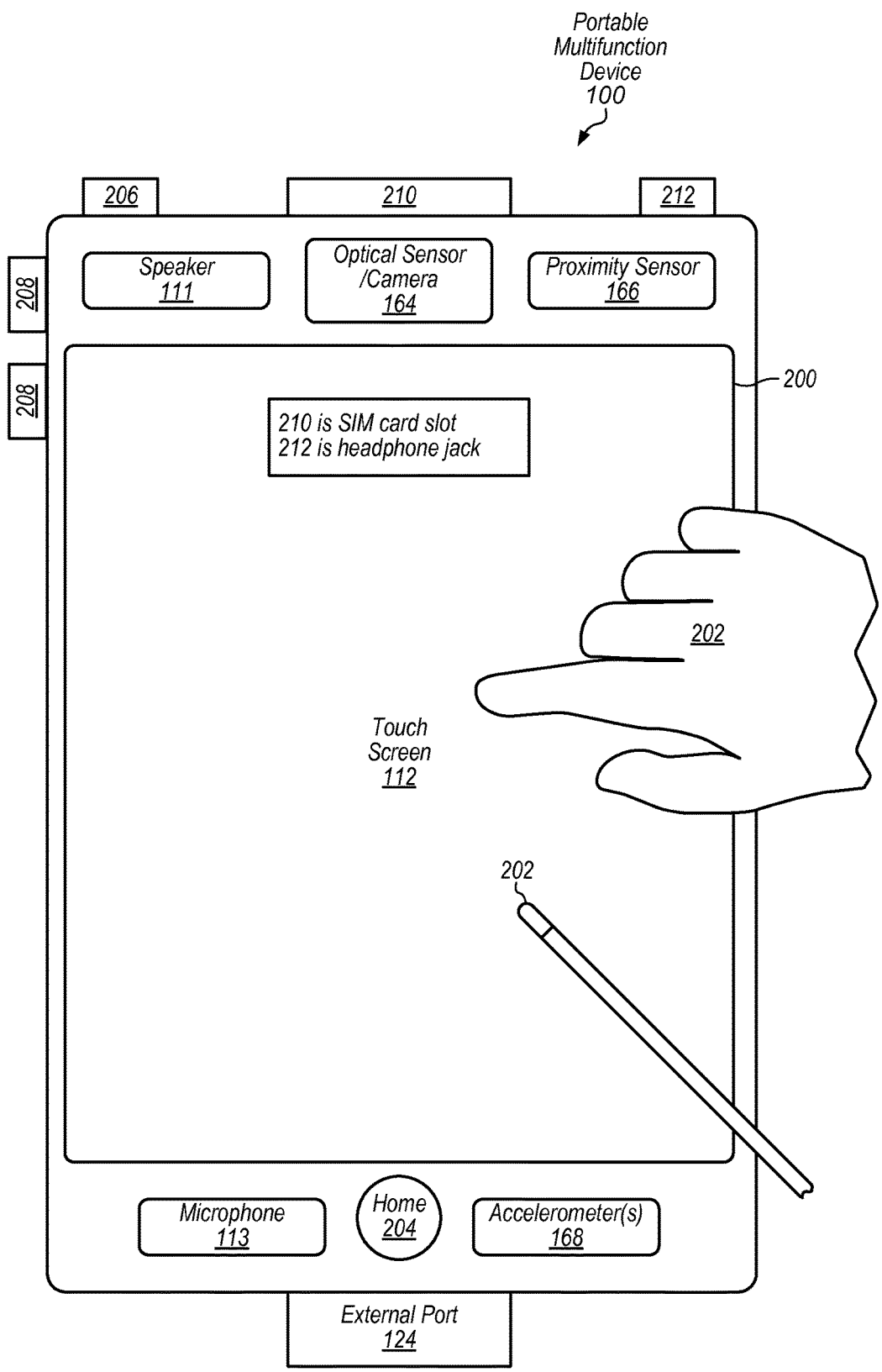
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Camera Component Configuration

In some embodiments incoming light focused through the optical lens elements passes through a further optical element which splits the light to follow different paths according to its wavelength, and hence directs the light on to one of plural image sensors. In this way a greater proportion of the captured light is usefully gathered by the light sensitive pixels, and a lower proportion is lost by being absorbed by color filters.

In some embodiments, the substrate architecture packages two or three image sensors that image light from a single optical stack. The concept uses a 'color-splitting cube' to split the incoming light into three color bins (such as red, green and blue) and directly light in each bin solely onto one of the image sensors. In this way the incoming light is much more efficiently used. Unlike conventional image sensors, where a series of color filters are applied over the light sensitive pixels (for example in a Bayer pattern), and hence the majority of light is absorbed by the color filters and lost, some embodiments allow for a given lens image circle size, a higher resolution image can be recorded owing to the greater number of pixels and the more efficient use of light.

There are several possible camera architectures that could make use of this configuration, however, one important architecture is for a miniature zoom camera for use in mobile devices. For such a camera, the Z thickness of the camera is the most important dimension. One typical proposal to minimize the Z thickness is to fold the optics of the camera, such that the optical axis of most of the lens elements is orthogonal to the Z thickness direction. In such a configuration, the Z height of the camera is now determined by the diameter of the lens elements. For this reason, embodiments that reduce the image circle and hence the diameters of the lens elements will reduce the Z thickness. In addition, such a reduction in image circle also reduced the total track length (TTL) of the lens, also reducing the XY dimensions of the camera.

As described below, embodiments present invention assume but do not require a flip-chip bond connection between the image sensor and ceramic substrate, which is one embodiments of an image sensor connection process, since it avoids wire bonds between image sensor and substrate, and since the ceramic substrate have low thermal expansion and is well matched to the silicon image sensor. In some embodiments, it is typical for this type of ceramic packaging that the electrical connections from the ceramic to outside the camera are routed though a flexible printed circuit (FPC). The connection between the ceramic and FPC is, in some embodiments, typically made between corresponding conductive pads on the ceramic and FPC, bonded together with an anisotropic conductive film (ACF) process. The ACF film contains soft metal balls in a polymer matrix. When the tape is subjected to heat and pressure and is squashed between two surfaces, the polymer matrix deforms and bonds the surfaces together, whilst the metal balls protrude through to the surface of the tape creating an electrical connection through the thickness of the tape between the two surfaces. In this way electrical connection is made between the corresponding pads on the ceramic and FPC, whilst avoiding short-circuiting neighboring pads, since the embedded metal balls do not provide a conduction path in the plane of the tape.

In some embodiments, it is typical in such an arrangement for the ceramic substrate to have walls which extend around all four sides of the image sensor, with electrical connections on al four sides (depending on the system constraints). In other embodiments, it may be appreciated that the three image sensors are packaged very close together. For this reason at least two of the sides of the ceramic extend beyond the image sensor as little as possible. In practice for some embodiments, a third is minimized too to avoid increasing the side of the camera. However, to be consistent with the packaging of the zoom actuators, there is space on the forth side. Some embodiments concentrate the vast majority of the multiple electrical connection pads on the ceramic onto one side of the image sensor, most preferably outside one of the short sides of the image sensor (or at least short side of the pixel array), so that the three image sensors can be assembled with the pixel arrays long side to long side.

The contact pads require a certain surface area to ensure good electrical contact after the ACF process. For this reason, since the contact pads are predominantly on one side of the image, some embodiments do not fit all the pads on the bottom surface of the ceramic substrate, under the image sensor. Some embodiments include additional pads on the top surface of the ceramic, and fold over a tab on the FPC for each ceramic substrate to ACF bond to the top surface of the ceramic.

In some embodiments, for a typical digital camera using a single image sensor with color filters over the pixel array, the most typical arrangement of color filters is the Bayer pattern illustrated in FIG. 29, which is described below. It may be observed that in this arrangement there are twice as many green pixels as there are red or blue. Apart from this being a convenient rectilinear pattern, green is chosen to have a higher resolution because green wavelengths are towards the middle of the spectrum of visible light, and the human eye is this more sensitive to green light. Hence green light best correlates with the overall luminance in an image. Such an embodiment attempts to achieve full resolution in all three colors.

Figure 30:
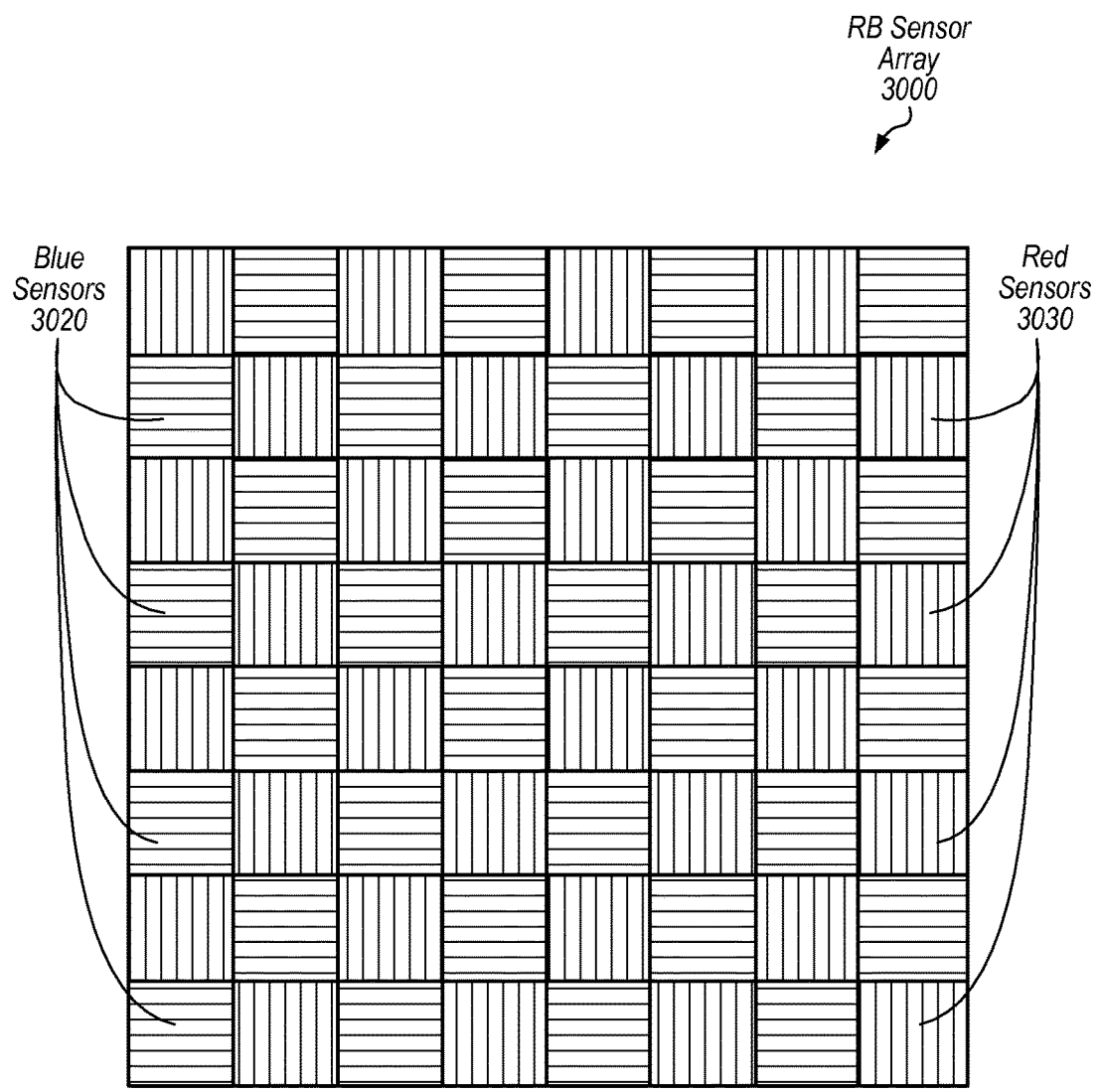
FIG. 30 depicts an image sensor pixel array for use in a camera for use in a portable multifunction device in accordance with some embodiments.

Some embodiments halve the resolution of the red and blue images in a similar manner to the Bayer pattern, as illustrated in FIG. 30. This is deemed an acceptable compromise. Putting it a different way, for the proposed configuration of two image sensors, there are precisely double the number of red, green and blue pixels that there would be in a camera with a similar single image sensor equipped with a Bayer pattern of color filters.

In some embodiments, the structure of the substrate has no wall around the image sensor; the surface of the ceramic onto which the image sensor is flip-chip bonded forms the bottom surface of the whole component. All the pads on the substrate that will routed externally from the camera to electrically connect it to the system are on the same surface as the flip-chip pads, and they are all located off the same side of the image sensor. There are additional castellations cut into the top surface of the ceramic. Jointly or separately, these features reduce the size, and particularly the width and thickness of the ceramic. It may be appreciated that owing to the orthogonal configuration of the image sensors around the color splitting cuboid, an increase in the thickness of width of the ceramic may cause the image sensors to move away from the cuboid, growing the Z height of the camera. The length of the substrate, merely affects the width of the camera (see the previous disclosure to illustrations). For routing, and under-filling purposes, an excess in ceramic width is sometimes used beyond the edge of the image sensor.

In some embodiments ceramic substrate manufacture is made up of laminating green (unfired) ceramic sheets with printed metal electrode between them. Arrays of devices are fabricated together, before dicing after firing. This means that each side of each lamination layer most extends to the sides of the ceramic component. In some embodiments, the presence of the castellations on each side of the ceramic ensures that there are some regions of these ceramic layers that extend to the sides of the component. It may be observed that where a castellation appears on one side of the ceramic, adjacent to this on the other side the ceramic extends to the edge, and vice versa, such that when the substrates are assembled onto the cuboid, there can be some notional overlap between substrates in the corners. In some embodiments, the castellations prevent the substrates clashing in these overlapping corner regions.

In some embodiments, castellations of neighboring substrates mesh with each other, and hence these substrates are as close as possible to each other. As there is no room for pads around the sides of the image sensor, all the pads to one side of the image sensor. This avoids the need for a ceramic wall around the image sensor to relieve the FPC pads from the image sensor. The FPC pads can now be positioned next to the image sensor, rather than over the top of it. This means the FPC pads can be on the same flat surface as the image sensor flip-chip pads.

Camera Component Hardware Package

Figure 3A:
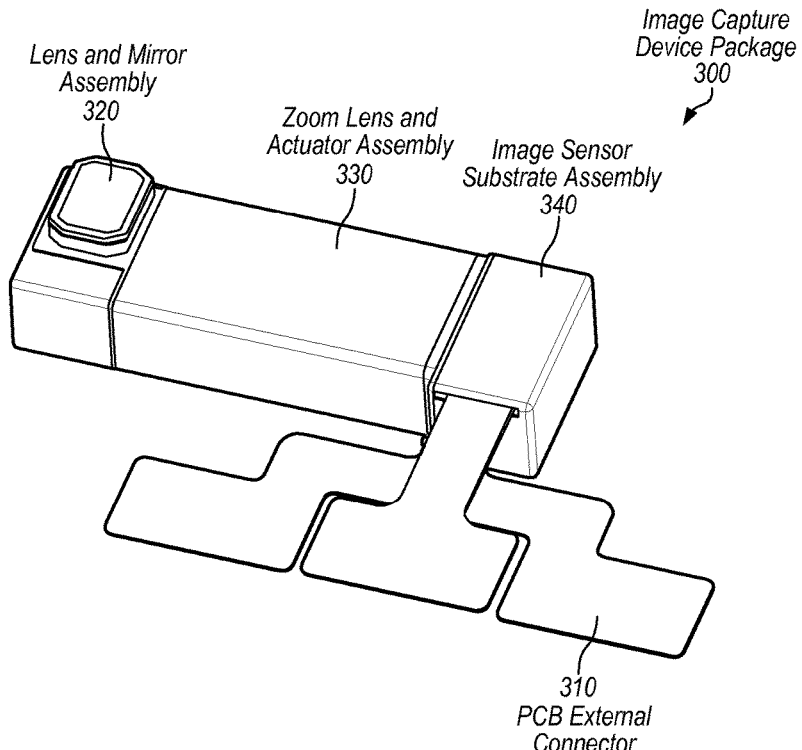
FIG. 3A depicts components of a camera for use in portable multifunction device in accordance with some embodiments.

FIG. 3A depicts components of a camera for use with in portable multifunction device in accordance with some embodiments. A lens and mirror assembly 320, a zoom lens and actuator assembly 330, and an image sensor substrate assembly 340 are shown as components of an image capture device package 300, which connects to other components of a multifunction device by means of a PCB external connector 310.

Figure 3B:
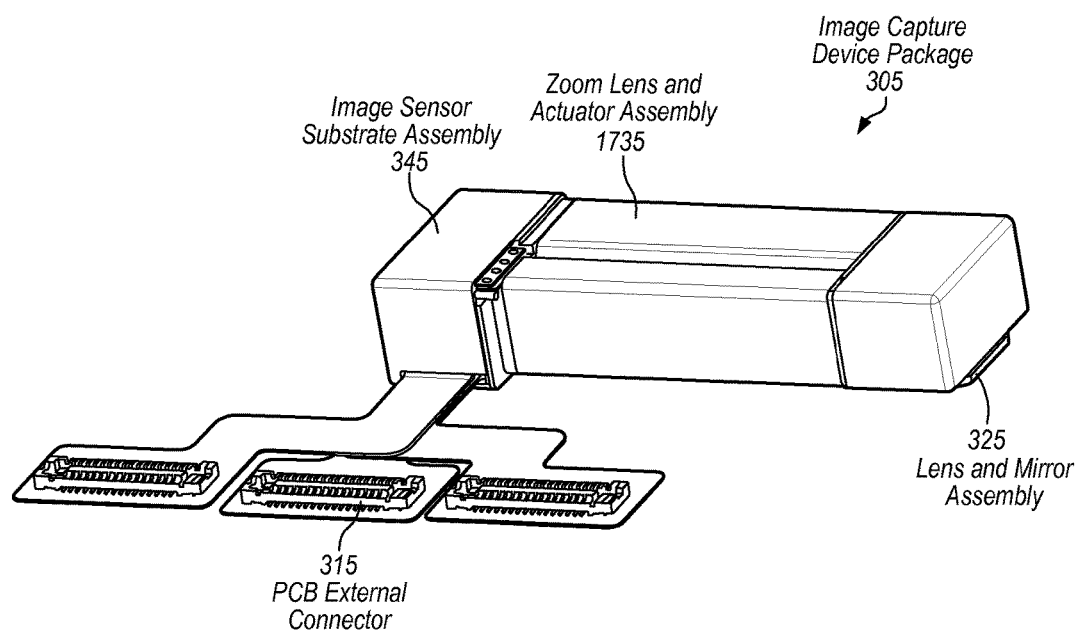
FIG. 3B illustrates a camera for use in portable multifunction device in accordance with some embodiments.

FIG. 3B illustrates a camera for use with in portable multifunction device in accordance with some embodiments. A lens and mirror assembly 325, a zoom lens and actuator assembly 335, and an image sensor substrate assembly 345 are shown as components of an image capture device package 305, which connects to other components of a multifunction device by means of a PCB external connector 315. In some embodiments image capture device package 710 has dimensions X=28.5 mm, Y=8.45 mm, Z=5.7 mm, and Z=6.8 mm where the lens emerges. Note that the camera is generally thin in Z, minimally wide in Y, but long in X. Whilst in general, size for the camera should be minimized when used in mobile devices, these dimensions are consistent with the an embodiment of design constraints, where minimizing Z is most important, Y is important, and X is relatively less important.

Figure 4:
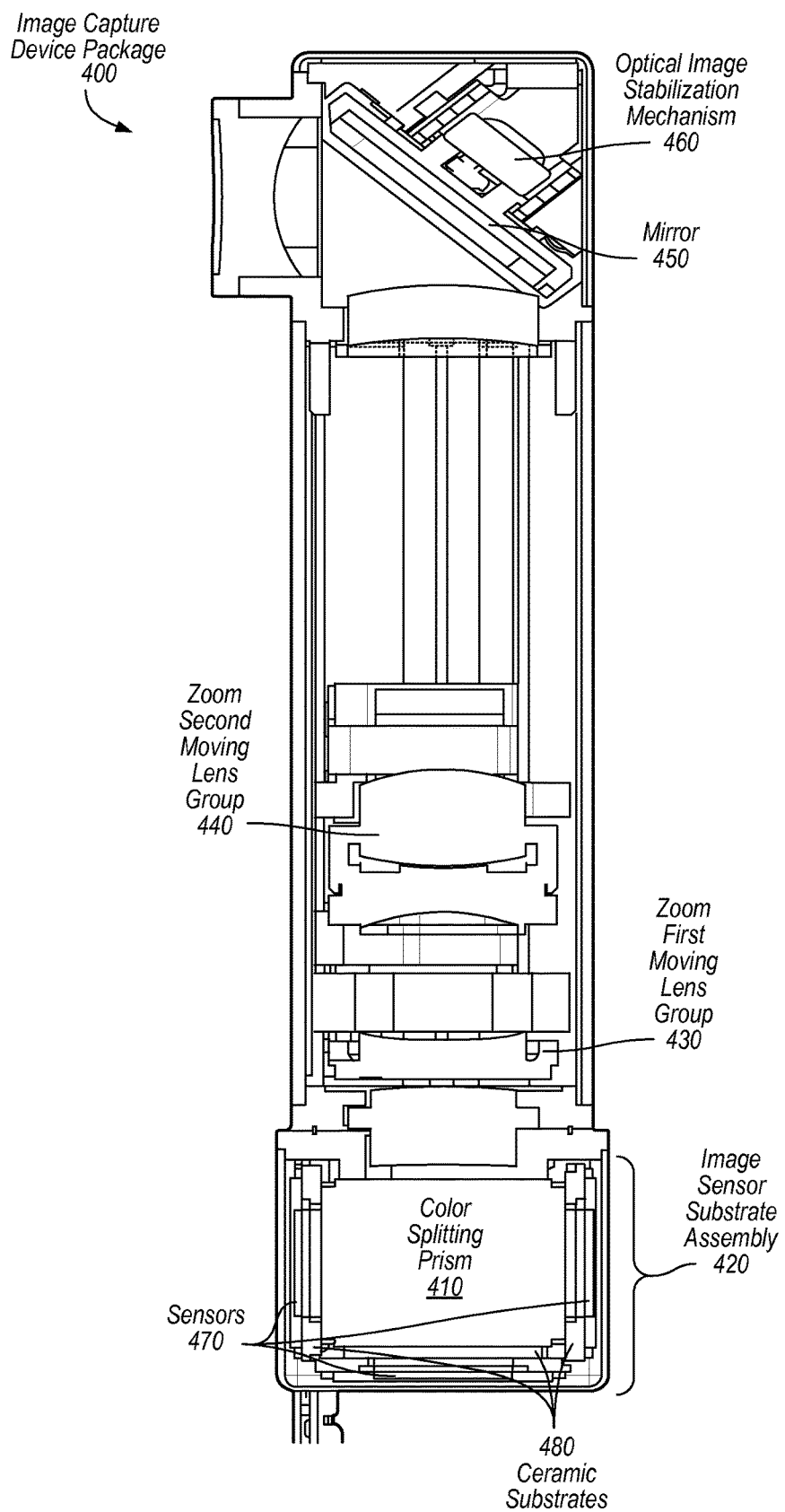
FIG. 4 depicts a camera for use in portable multifunction device in accordance with some embodiments.

FIG. 4 illustrates a camera for use with in portable multifunction device in accordance with some embodiments. FIG. 4 shows a cross-sections through the optical stack of the camera (image capture device package 400), including a color-splitting prism 410, an image sensor substrate assembly 420, a zoom first moving lens group 430, a zoom second moving lens group 440, a mirror 450 and an optical image stabilization mechanism 460. FIG. 4 shows zoom first moving lens group 430 and zoom second moving lens group 440 in a first position for a zoom lens ratio. Mirror 450 is used to fold the optics, and is nominally mounted at 45 degrees to the optical axis of all the lens elements. FIG. 4 also illustrates the triangular section into which optical image stabilization mechanism 460 to tilt mirror 450 is fitted. As can be observed in FIG. 4, the substrate assembly 420 is made up of three image sensors 470 and a prism 410, which splits the light into three color components, directing one color to each image sensor. This tri-sensor arrangement is very efficient as little light is wasted in color filters, and hence minimizes the lens size for a given combined image sensor surface area. Ceramic substrates 480 are also shown. Note that, in some embodiments, only two of substrates 480 and image sensors 470 are included.

Figure 5:
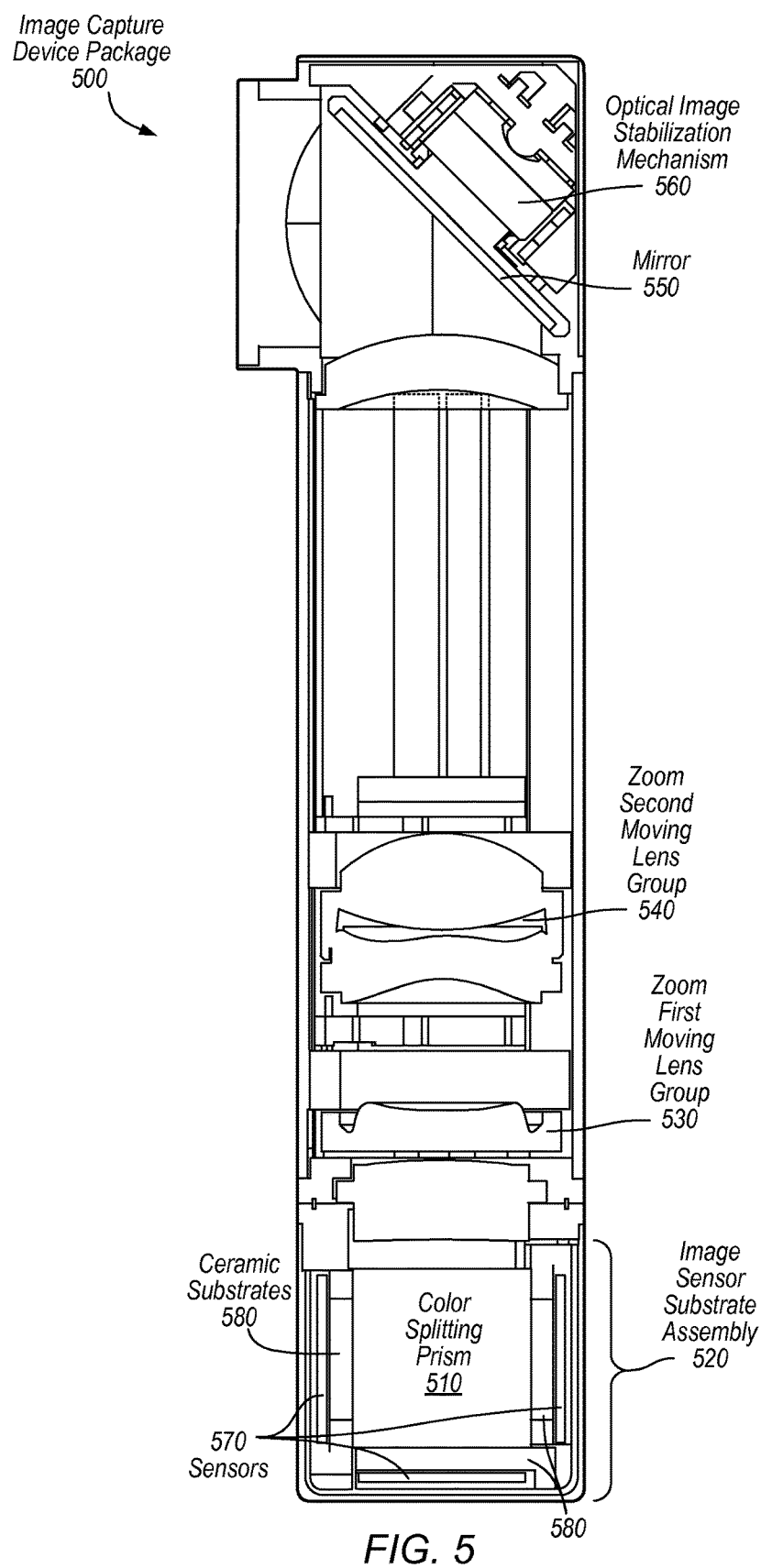
FIG. 5 illustrates an alternative embodiment of a camera for use in a portable multifunction device in accordance with some embodiments.

FIG. 5 illustrates an alternative embodiment of a camera for use with in portable multifunction device in accordance with some embodiments. FIG. 5 shows a cross-sections through the optical stack of the camera (image capture device package 500), including a color-splitting prism 510, an image sensor substrate assembly 520, a zoom first moving lens group 530, a zoom second moving lens group 540, a mirror 550 and an optical image stabilization mechanism 560. FIG. 5 shows zoom second moving lens group 530 and zoom first moving lens group 540 in a first position for a zoom lens ratio. Mirror 550 is used to fold the optics, and is nominally mounted at 45 degrees to the optical axis of all the lens elements. FIG. 5 also illustrates the triangular section into which optical image stabilization mechanism 560 to tilt mirror 550 is fitted. As can be observed in FIG. 5, the substrate assembly 520 is made up of three image sensors 570 and a prism 510, which splits the light into three color components, directing one color to each image sensor. In some embodiments, this tri-sensor arrangement is very efficient as little light is wasted in color filters, and hence minimizes the lens size for a given combined image sensor surface area. Ceramic substrates 580 are also shown. Note that, in some embodiments, only two of substrates 580 and image sensors 570 are included.

Figure 6:
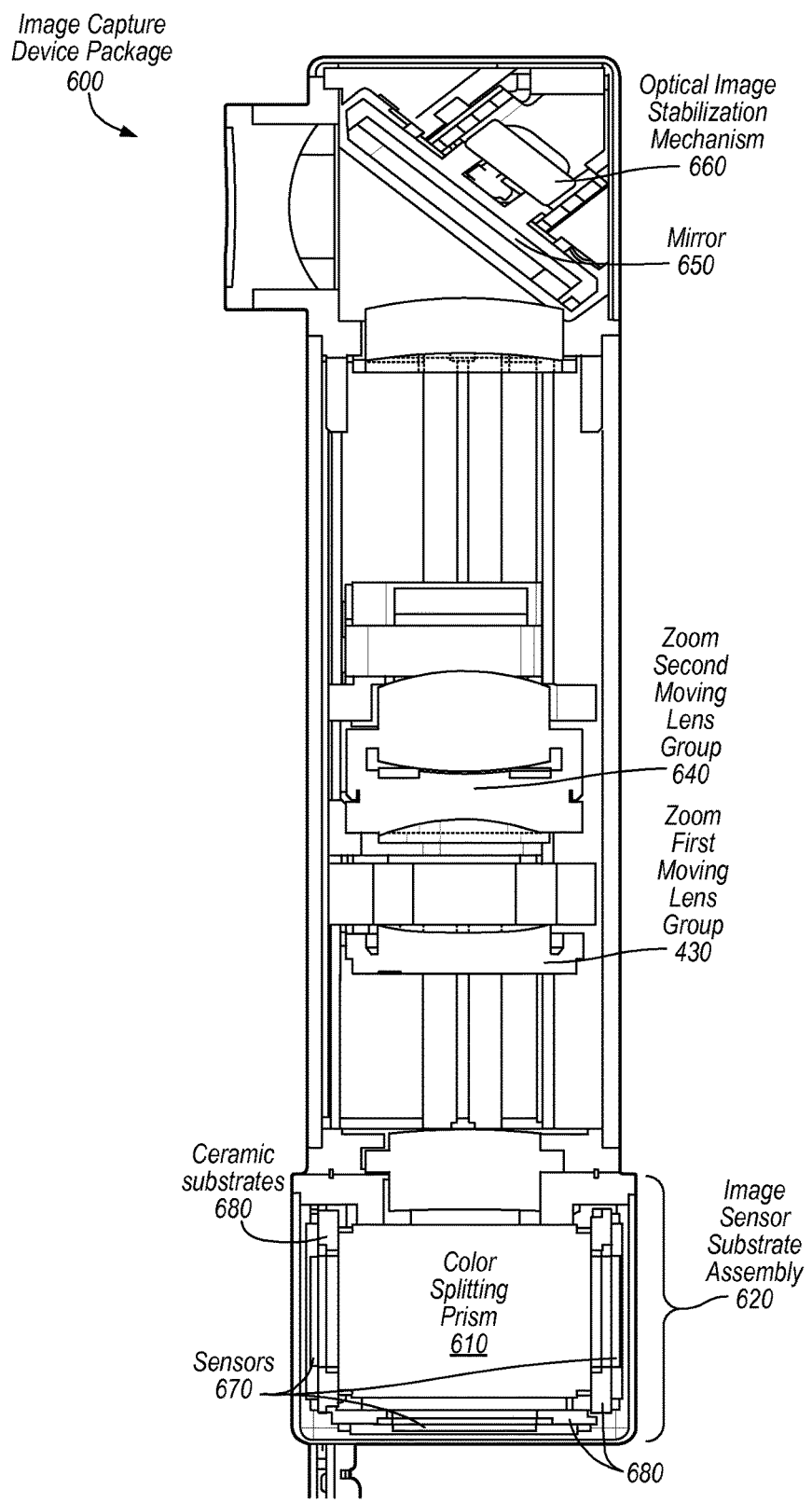
FIG. 6 depicts a camera for use in portable multifunction device in accordance with some embodiments.

FIG. 6 depicts a camera for use with in portable multifunction device in accordance with some embodiments. FIG. 6 shows a cross-sections through the optical stack of the camera (image capture device package 600), including a color-splitting prism 610, an image sensor substrate assembly 610, a zoom second moving lens group 630, a zoom first moving lens group 640, a mirror 650 and an optical image stabilization mechanism 660. FIG. 6 shows zoom first moving lens group 630 and zoom second moving lens group 640 in a second position for a zoom lens ratio. Mirror 650 is used to fold the optics, and is nominally mounted at 45 degrees to the optical axis of all the lens elements. FIG. 6 also illustrates the triangular section into which optical image stabilization mechanism 660 to tilt mirror 650 is fitted. As can be observed in FIG. 6, the substrate assembly 620 is made up of three image sensors 670 and a prism 610, which splits the light into three color components, directing one color to each image sensor. In some embodiments, this tri-sensor arrangement is very efficient as little light is wasted in color filters, and hence minimizes the lens size for a given combined image sensor surface area. Ceramic substrates 680 are also shown. Note that, in some embodiments, only two of substrates 680 and image sensors 670 are included.

Figure 7:
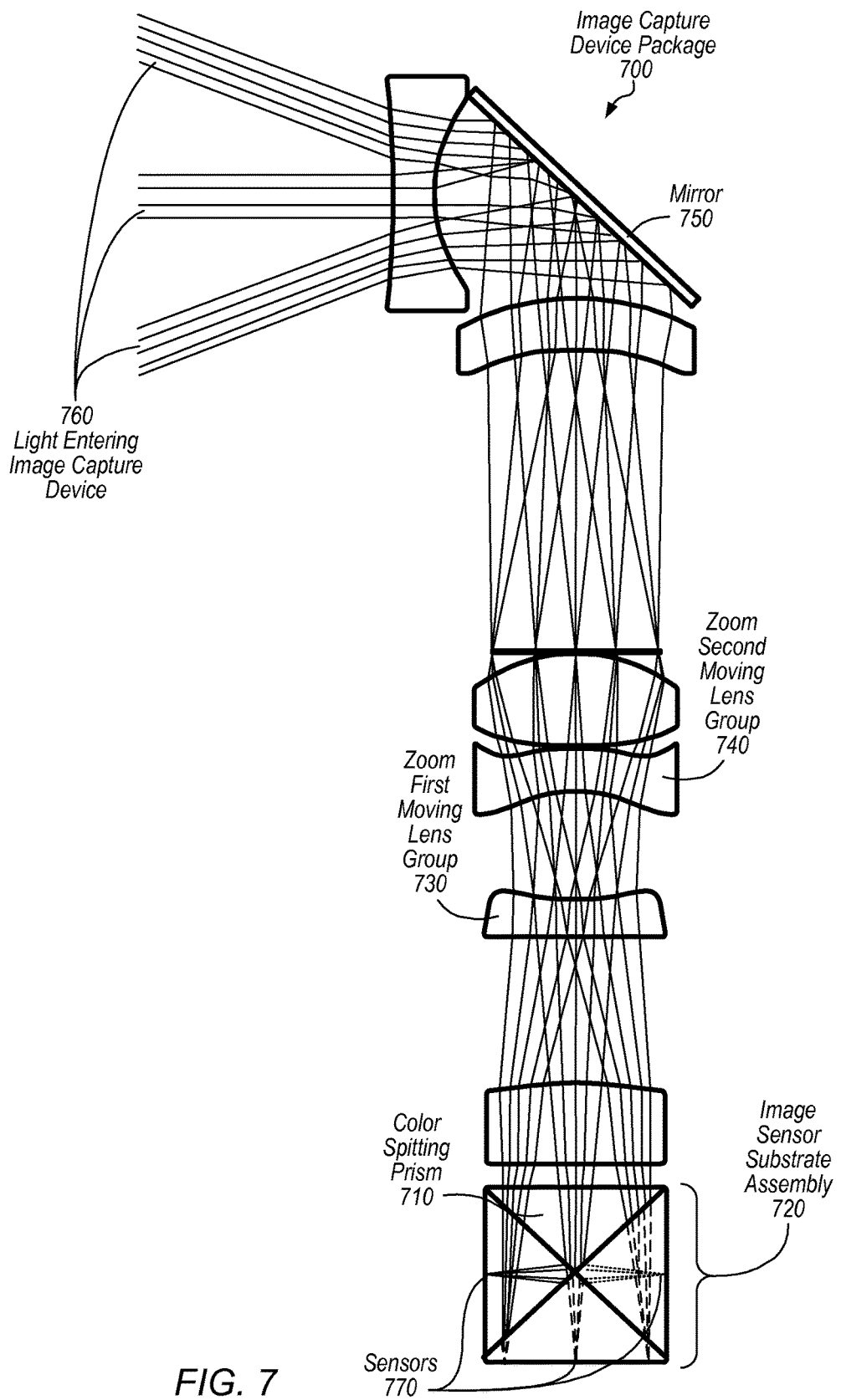
FIG. 7 illustrates a ray trace of light through a camera for use in a portable multifunction device in accordance with some embodiments.

FIG. 7 illustrates a ray trace of light through a camera for use in a portable multifunction device in accordance with some embodiments. An image capture device 700 is shown, as is light entering the image capture device 760, which reflects off of a mirror 750 and traverses a zoom second moving lens group 740 and a zoom first moving lens group 730 before reaching an image sensor substrate assembly 720 including color splitting prism 710 that directs components of the light to sensors 770.

Figure 8:
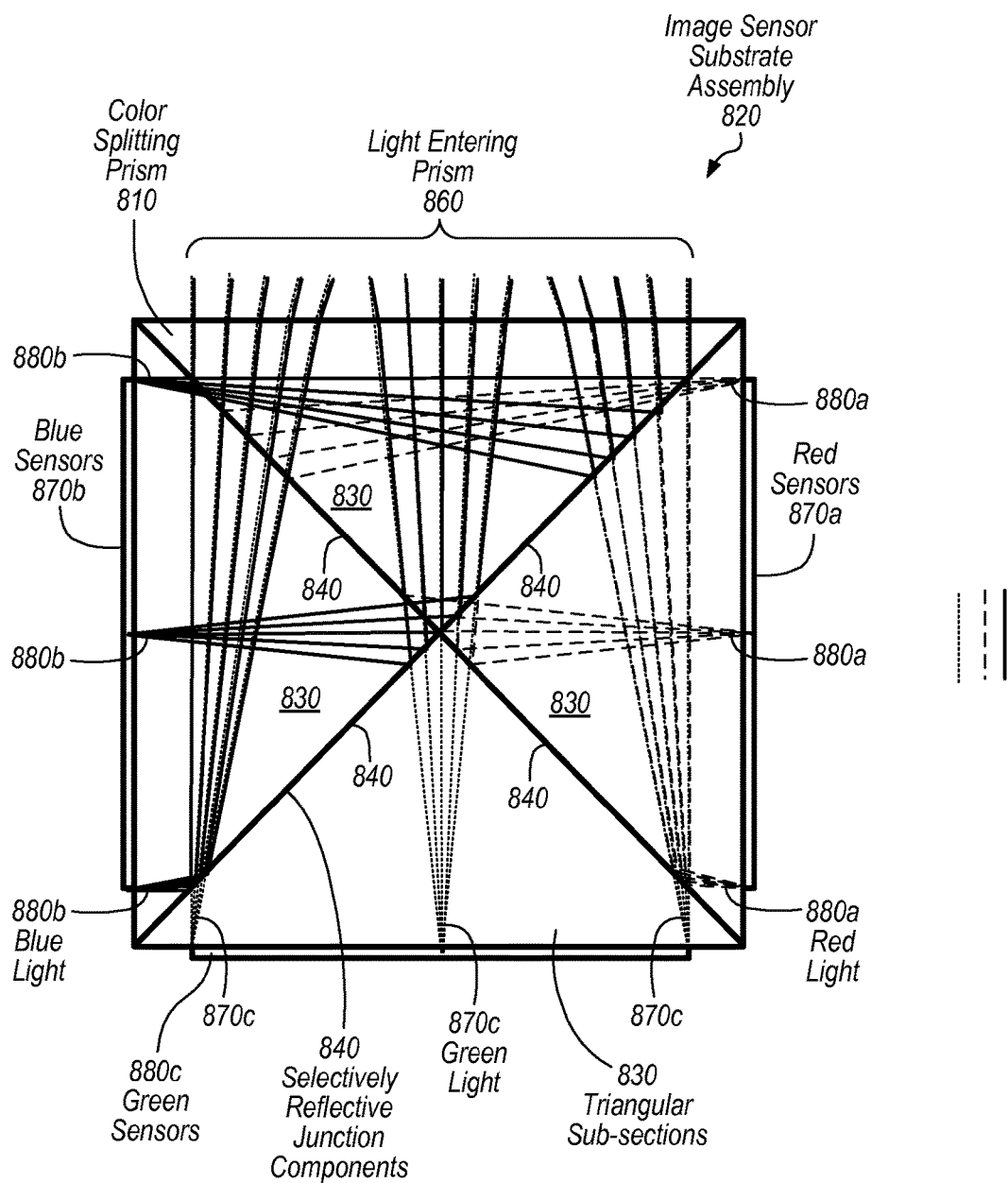
FIG. 8 depicts a ray trace of light through a light-splitting cube of camera for use in a portable multifunction device in accordance with some embodiments.

FIG. 8 depicts a ray trace of light through a light-splitting cube of camera for use in a portable multifunction device in accordance with some embodiments. An image sensor substrate assembly 820 includes a color-splitting prism 810 and red sensors 870a, blue sensors 870b and green sensors 870c. Light entering prism 860 is divided into blue light 880b, which is sent to blue sensors 870b, red light 880a, which is sent to red sensors 870a, and green light 880c, which is sent to green sensors 870c. Prism 810 is built from triangular sub-sections 830 that meet at selectively reflective junction components 840.

Figure 9A:
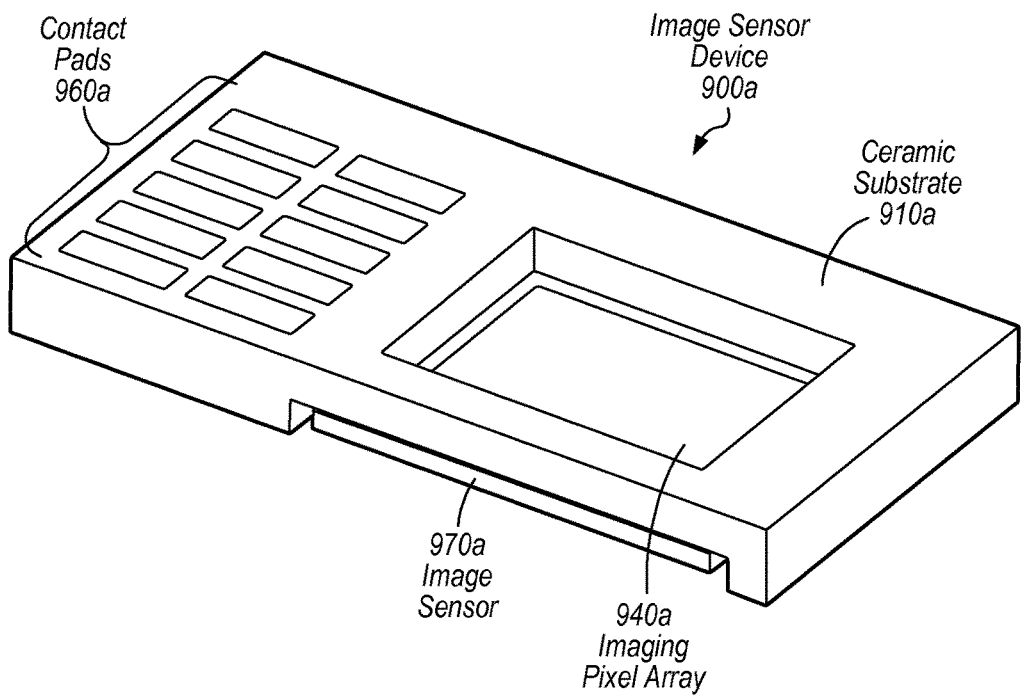
FIG. 9A illustrates an image sensor device including a flip-chip image sensor bonded to a ceramic substrate for use in a camera for use in a portable multifunction device in accordance with some embodiments.

FIG. 9A illustrates an image sensor device including a flip-chip image sensor bonded to a ceramic substrate for use in a camera for use in a portable multifunction device in accordance with some embodiments. An image sensor device 900a includes a ceramic substrate 910a with contact pads 960a and an image sensor 970a including an imaging pixel array 940a.

Figure 9B:
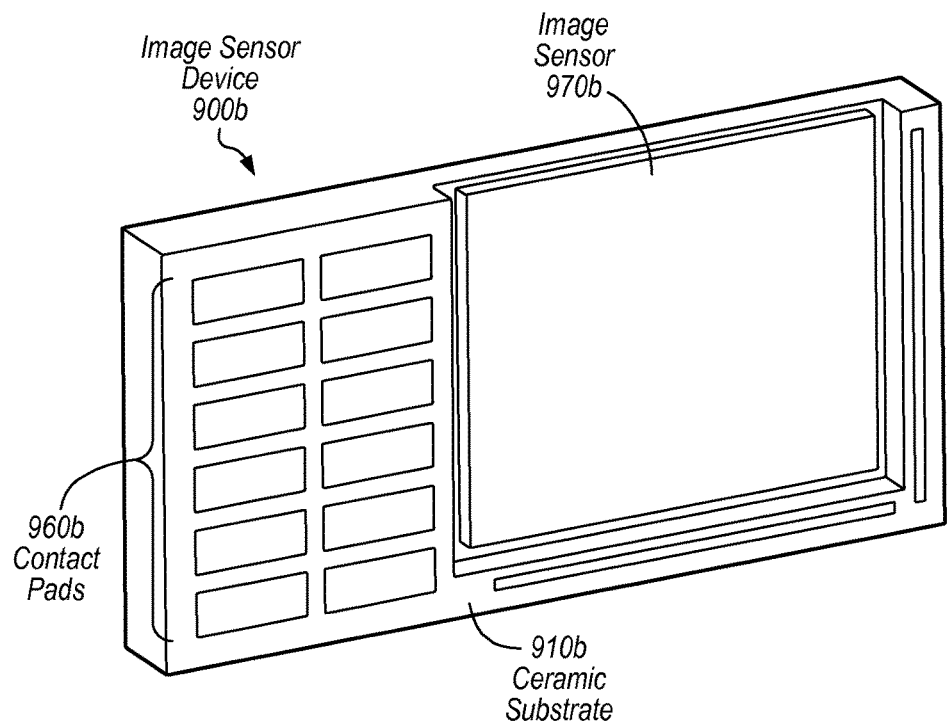
FIG. 9B depicts an image sensor device including a flip-chip image sensor bonded to a ceramic substrate for use in a camera for use in a portable multifunction device in accordance with some embodiments.

FIG. 9B depicts an image sensor device including a flip-chip image sensor bonded to a ceramic substrate for use in a camera for use in a portable multifunction device in accordance with some embodiments. An image sensor device 900b includes a ceramic substrate 910b with contact pads 960b and an image sensor 970b.

Figure 10:
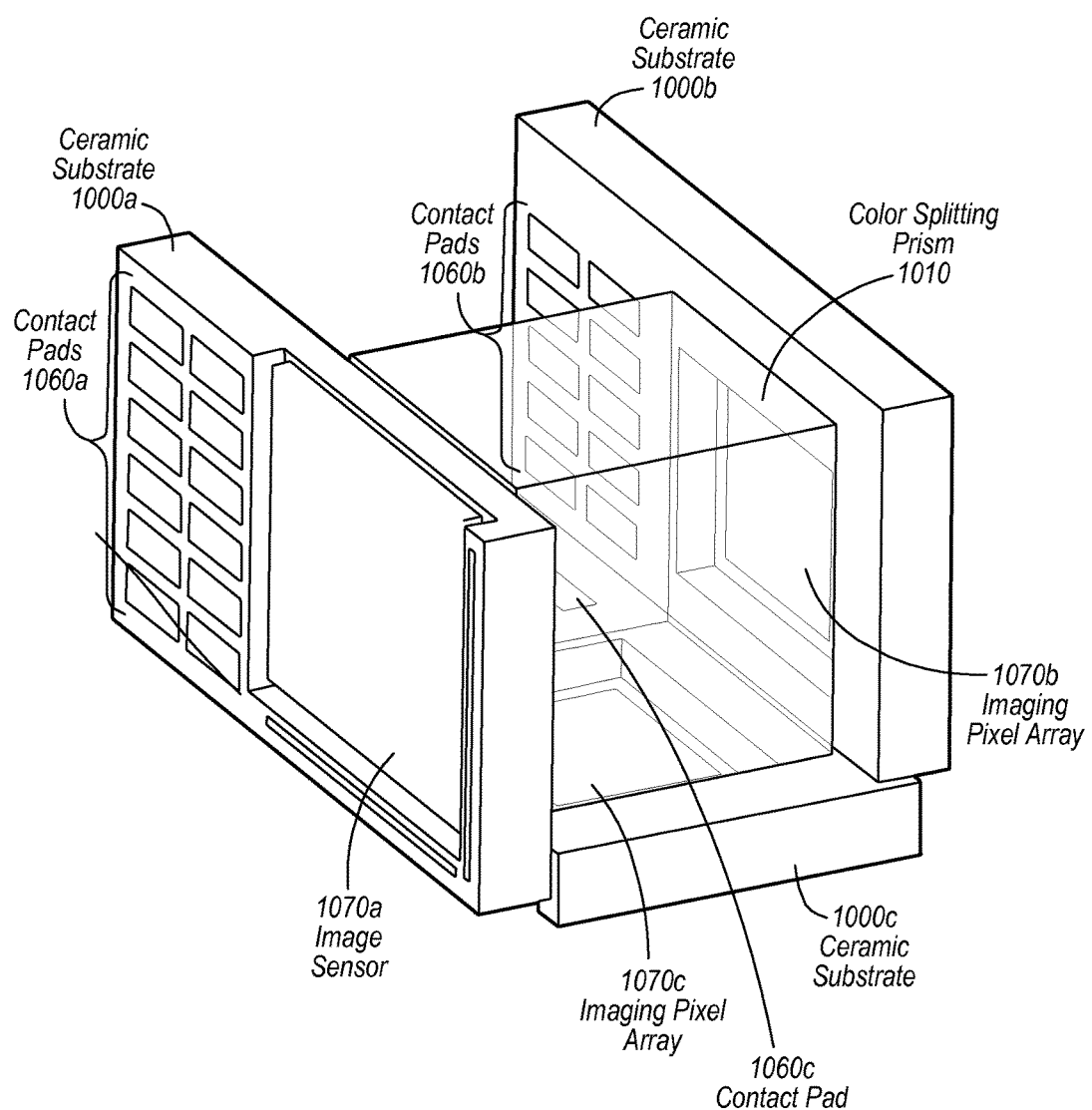
FIG. 10 illustrates articulation of a set of image sensor devices with a light splitting prism for use in a camera for use in a portable multifunction device in accordance with some embodiments.

FIG. 10 illustrates articulation of a set of image sensor devices with a light splitting prism for use in a camera for use in a portable multifunction device in accordance with some embodiments. Ceramic substrates 1000a-c of image sensor devices are articulated touching one another and a color splitting prism 1010. Each of ceramic substrates 1000a-c is attached to respective contact pads 1060a-c and a respective image sensor 1070a-c including an imaging pixel array 1070b-c.

Figure 11:
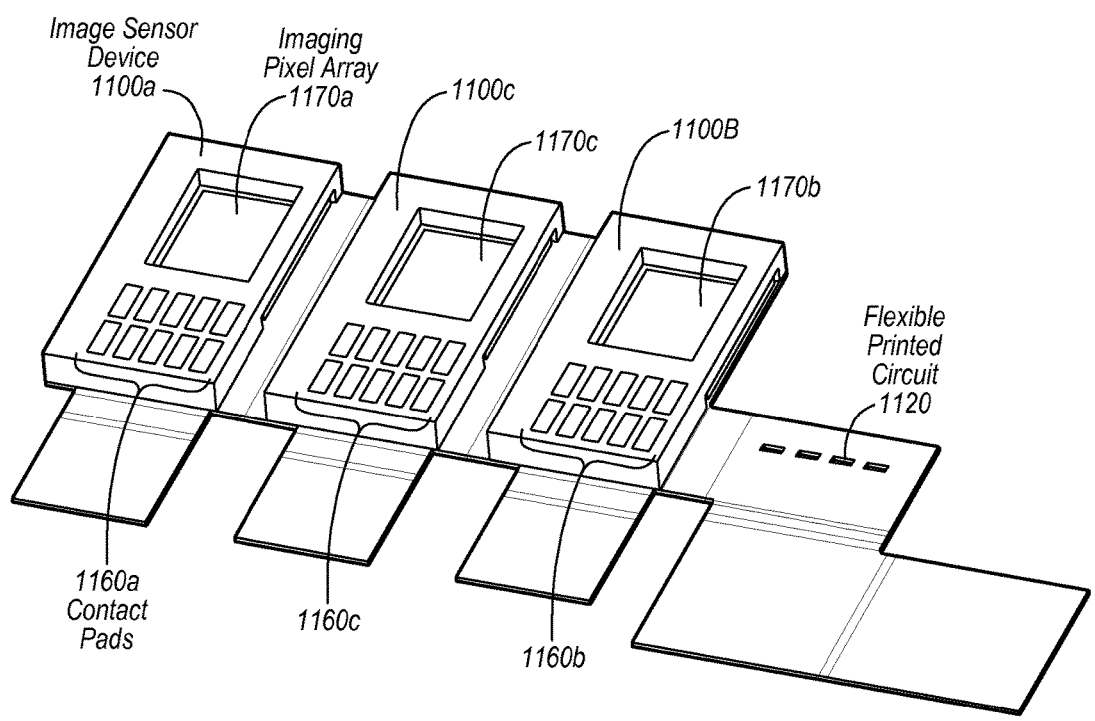
FIG. 11 depicts articulation of a set of image sensor devices with a flexible printed circuit for use in a camera for use in a portable multifunction device in accordance with some embodiments.

FIG. 11 depicts articulation of a set of image sensor devices with a flexible printed circuit for use in a camera for use in a portable multifunction device in accordance Image sensor devices 1100a-c containing image pixel arrays of image sensor devices 1170a-1170c are articulated to a flexible printed circuit 1120. Each of image sensor devices 1100a-c is attached to flexible printed circuit using respective contact pads 1160a-c.

Figure 12:
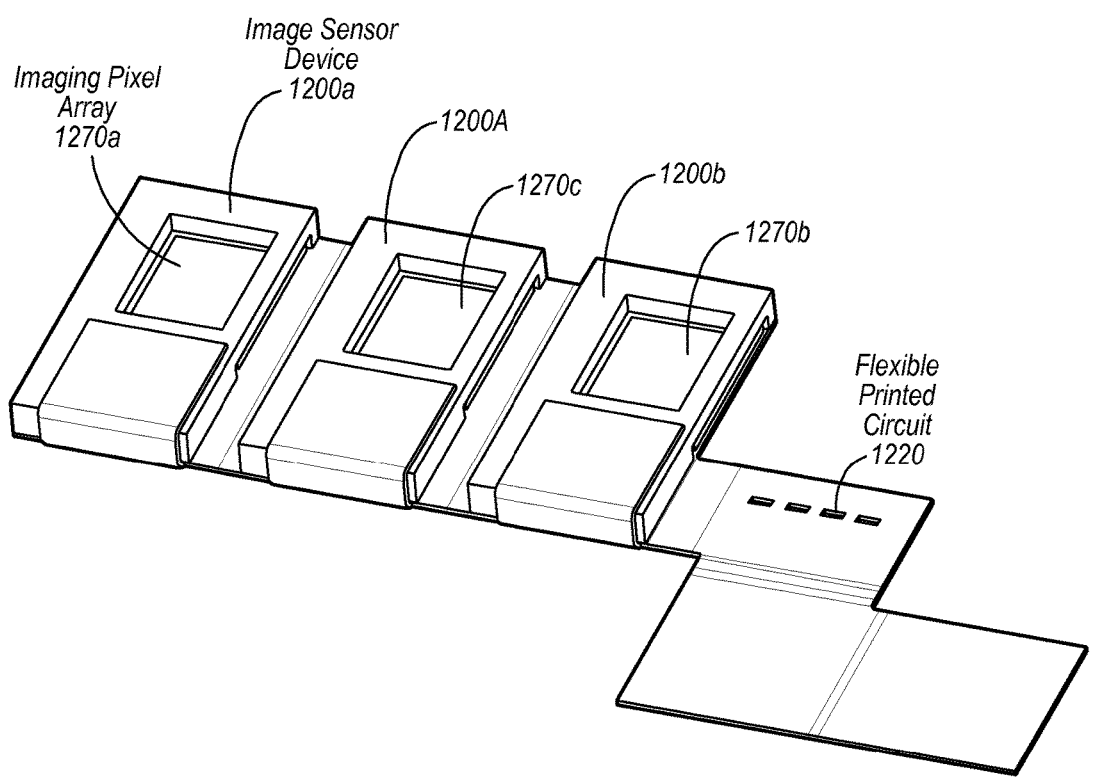
FIG. 12 illustrates articulation of a set of image sensor devices with a flexible printed circuit for use in a camera for use in a portable multifunction device in accordance with some embodiments.

FIG. 12 illustrates articulation of a set of image sensor devices with a flexible printed circuit for use in a camera for use in a portable multifunction device in accordance with some embodiments. Image sensor devices 1200a-c containing image pixel arrays of image sensor devices 1270a-1270c are articulated to a flexible printed circuit 1220. Each of image sensor devices 1100a-c is attached to flexible printed circuit using respective contact pads 1260a-c.

Figure 13:
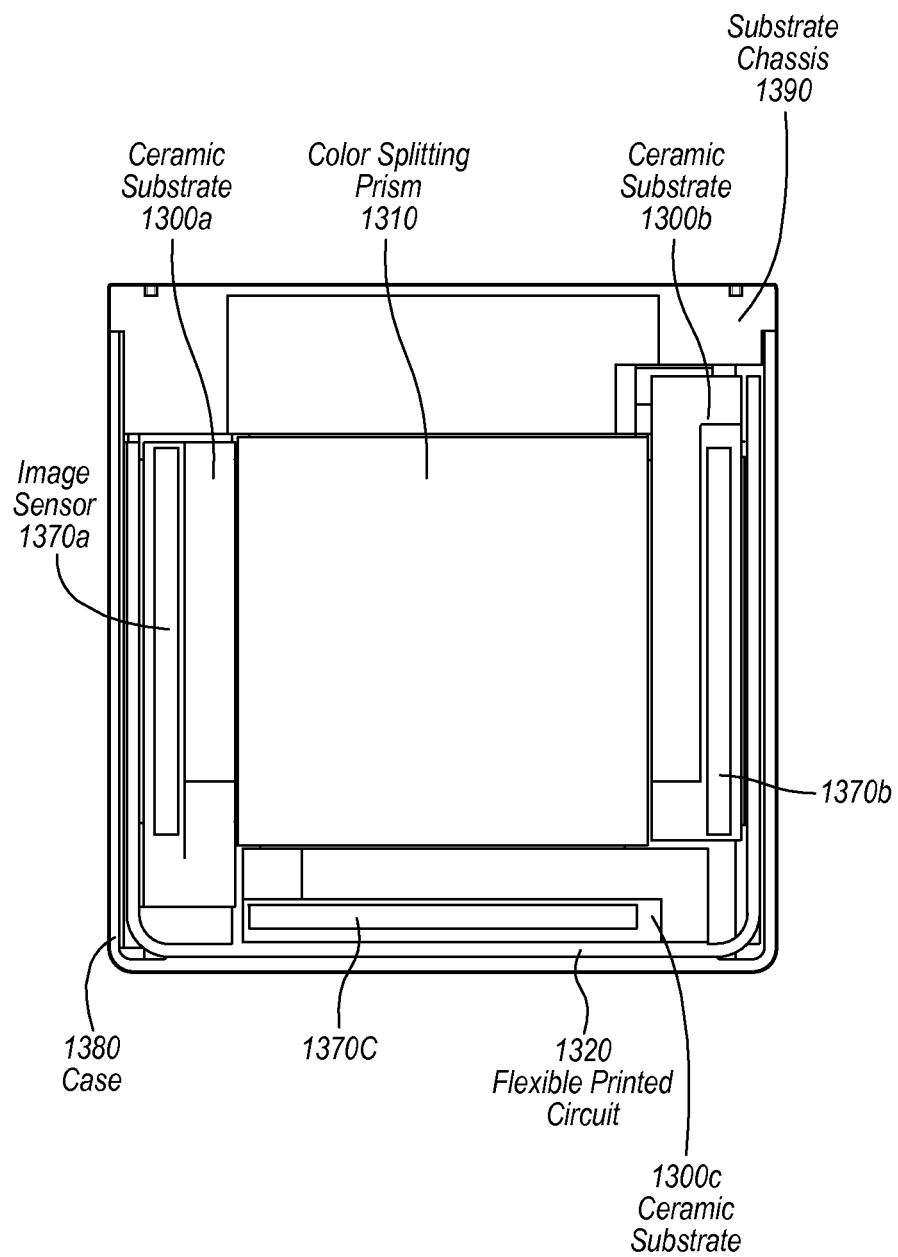
FIG. 13 depicts articulation of a set of image sensor devices with a light splitting prism for use in a camera for use in a portable multifunction device in accordance with some embodiments.

FIG. 13 depicts articulation of a set of image sensor devices with a light splitting prism for use in a camera for use in a portable multifunction device in accordance with some embodiments. Ceramic substrates 1300a-c with attached image sensor devices 1370a-1370c are articulated around a color-splitting prism 1310 using a substrate chassis 1390 and a flexible printed circuit 1320 within a case 1380.

Figure 14:
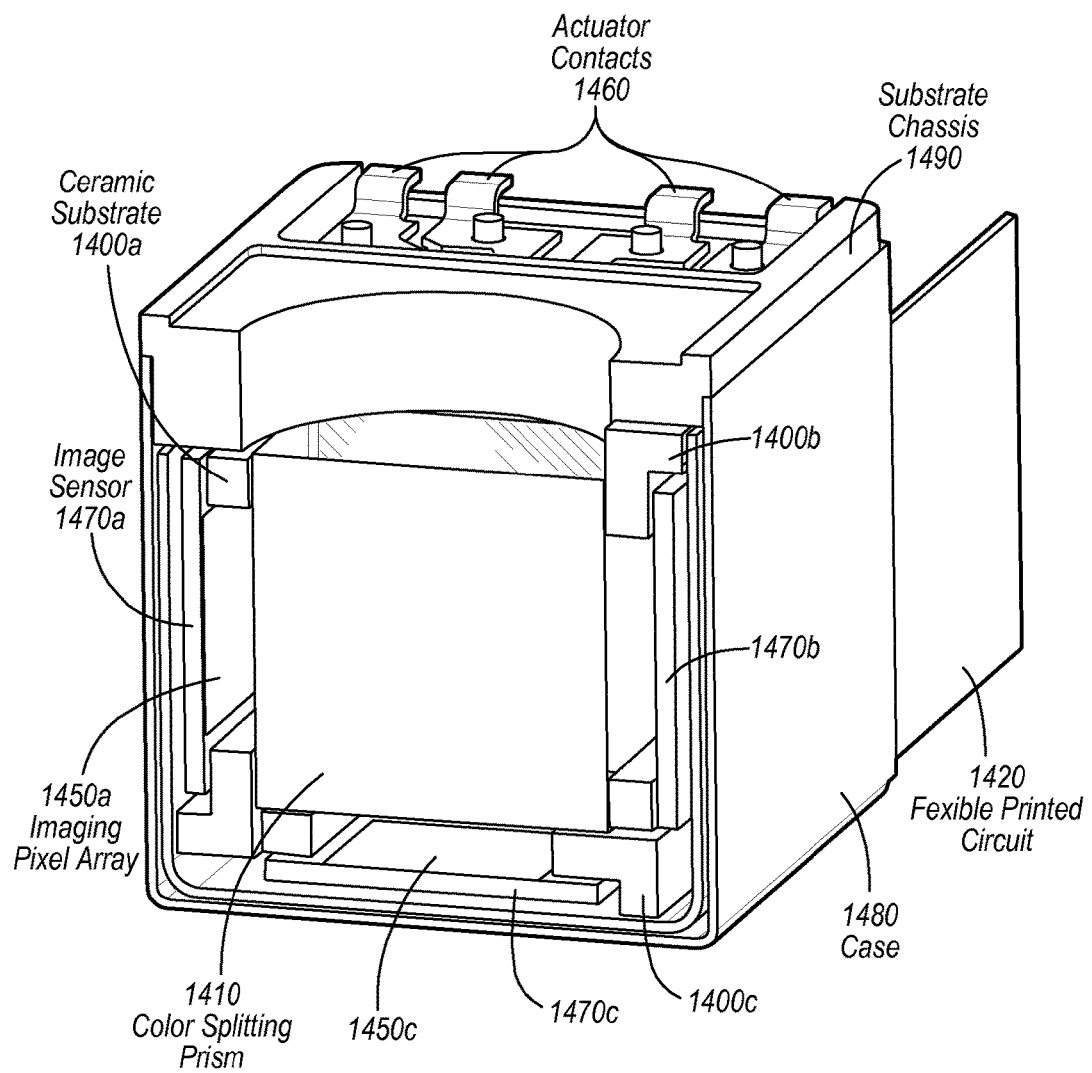
FIG. 14 illustrates articulation of a set of image sensor devices with a light splitting prism and a flexible printed circuit for use in a camera for use in a portable multifunction device in accordance with some embodiments.

FIG. 14 illustrates articulation of a set of image sensor devices with a light splitting prism and a flexible printed circuit for use in a camera for use in a portable multifunction device in accordance with some embodiments. Ceramic substrates 1400a-c with attached image sensors 1470a-1470c are articulated, with imaging pixel arrays 1450a-1450c pointed to a color-splitting prism 1410, using a flexible printed circuit 1420 within a case 1480 and a substrate chassis 1490 carrying a set of actuator contacts 1460.

Figure 15A:
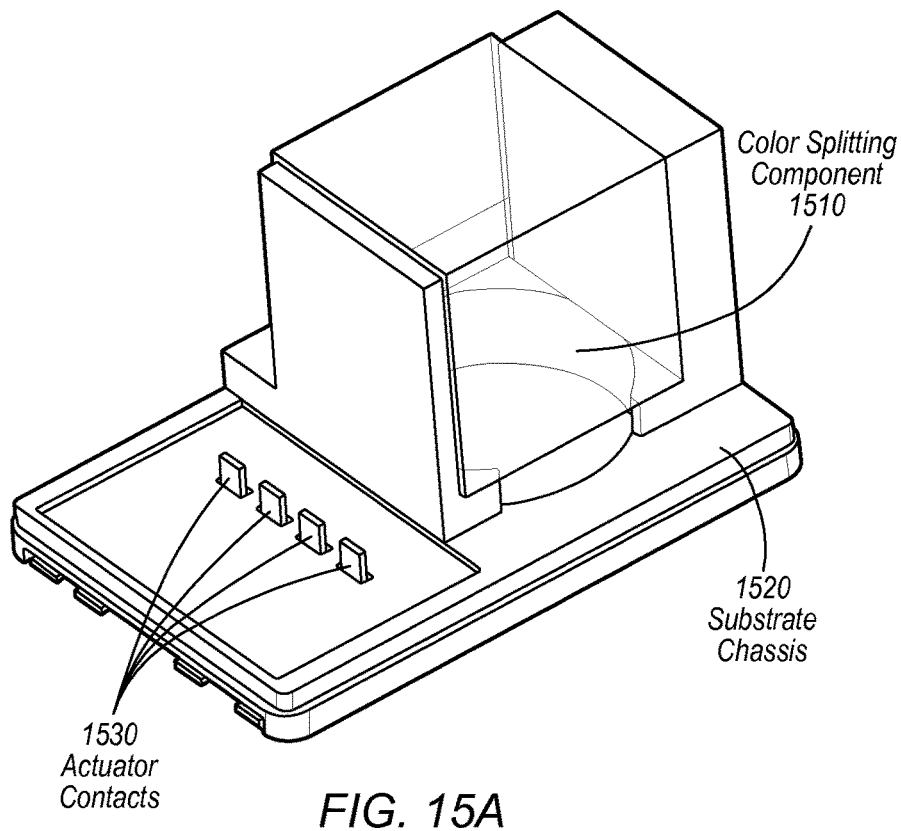
FIG. 15A depicts articulation of a color-splitting prism with a substrate chassis for use in a camera for use in a portable multifunction device in accordance with some embodiments.

FIG. 15A depicts articulation of a color-splitting prism with a substrate chassis for use in a camera for use in a portable multifunction device in accordance with some embodiments. A color splitting component (e.g., a prism) 1510 is articulated to a substrate chassis 1520, as are actuator contacts 1530.

Figure 15B:
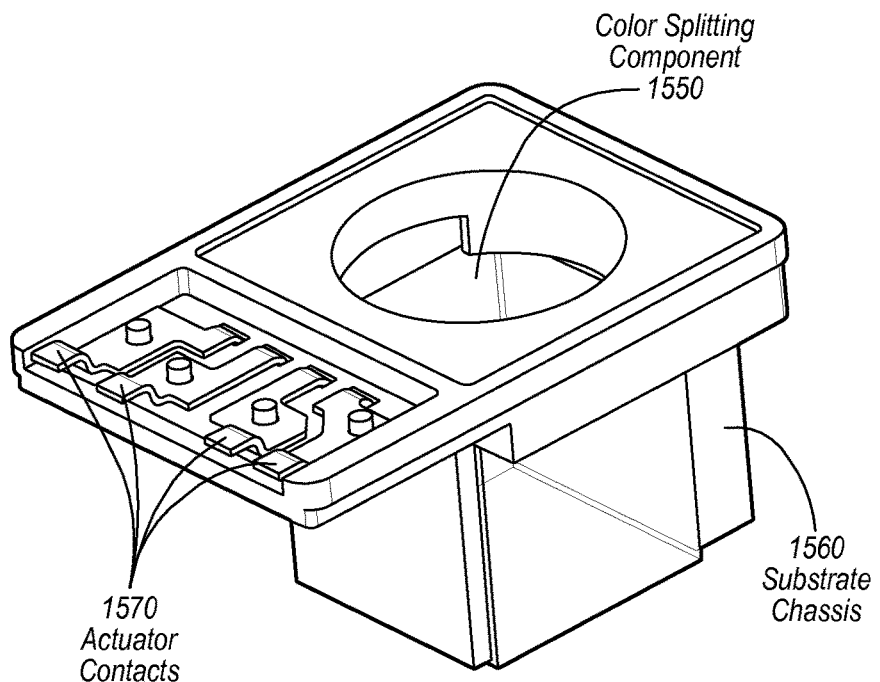
FIG. 15B illustrates articulation of a color-splitting prism with a substrate chassis for use in a camera for use in a portable multifunction device in accordance with some embodiments.

FIG. 15B illustrates articulation of a color-splitting prism with a substrate chassis for use in a camera for use in a portable multifunction device in accordance with some embodiments. A color splitting component (e.g., a prism) 1550 is articulated to a substrate chassis 1560, as are actuator contacts 1570.

Figure 16:
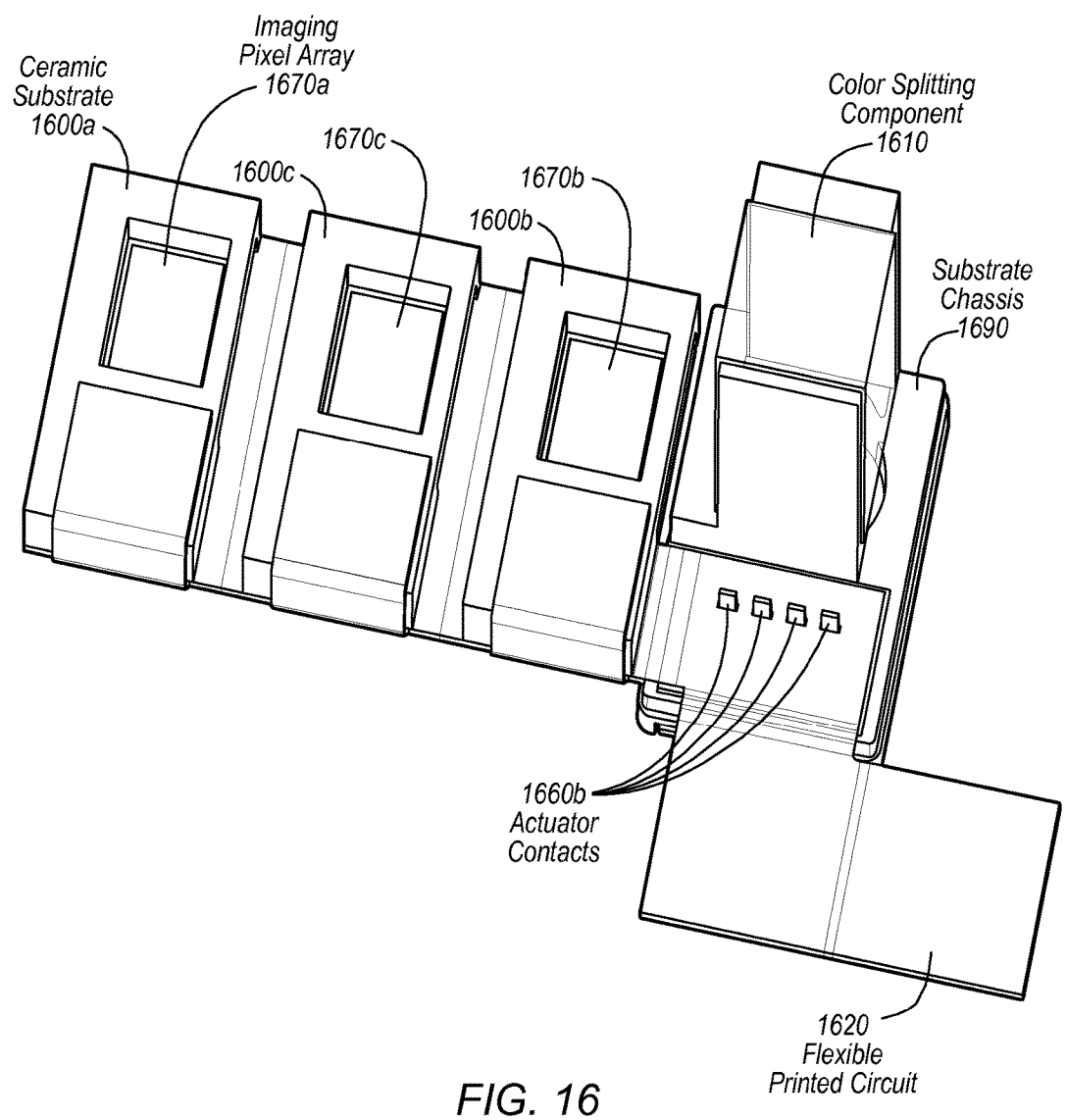
FIG. 16 depicts articulation of a set of image sensor devices with a light splitting prism, a flexible printed circuit, and a substrate chassis for use in a camera for use in a portable multifunction device in accordance with some embodiments.

FIG. 16 depicts articulation of a set of image sensor devices with a light splitting prism, a flexible printed circuit, and a substrate chassis for use in a camera for use in a portable multifunction device in accordance with some embodiments. Ceramic substrates 1600a-c are articulated to a flexible printed circuit 1620 to align image sensor device imaging pixel arrays 1670a-1670c pointed to a color-splitting component 1610, using a substrate chassis 1690 carrying a set of actuator contacts 1660.

Figure 17:
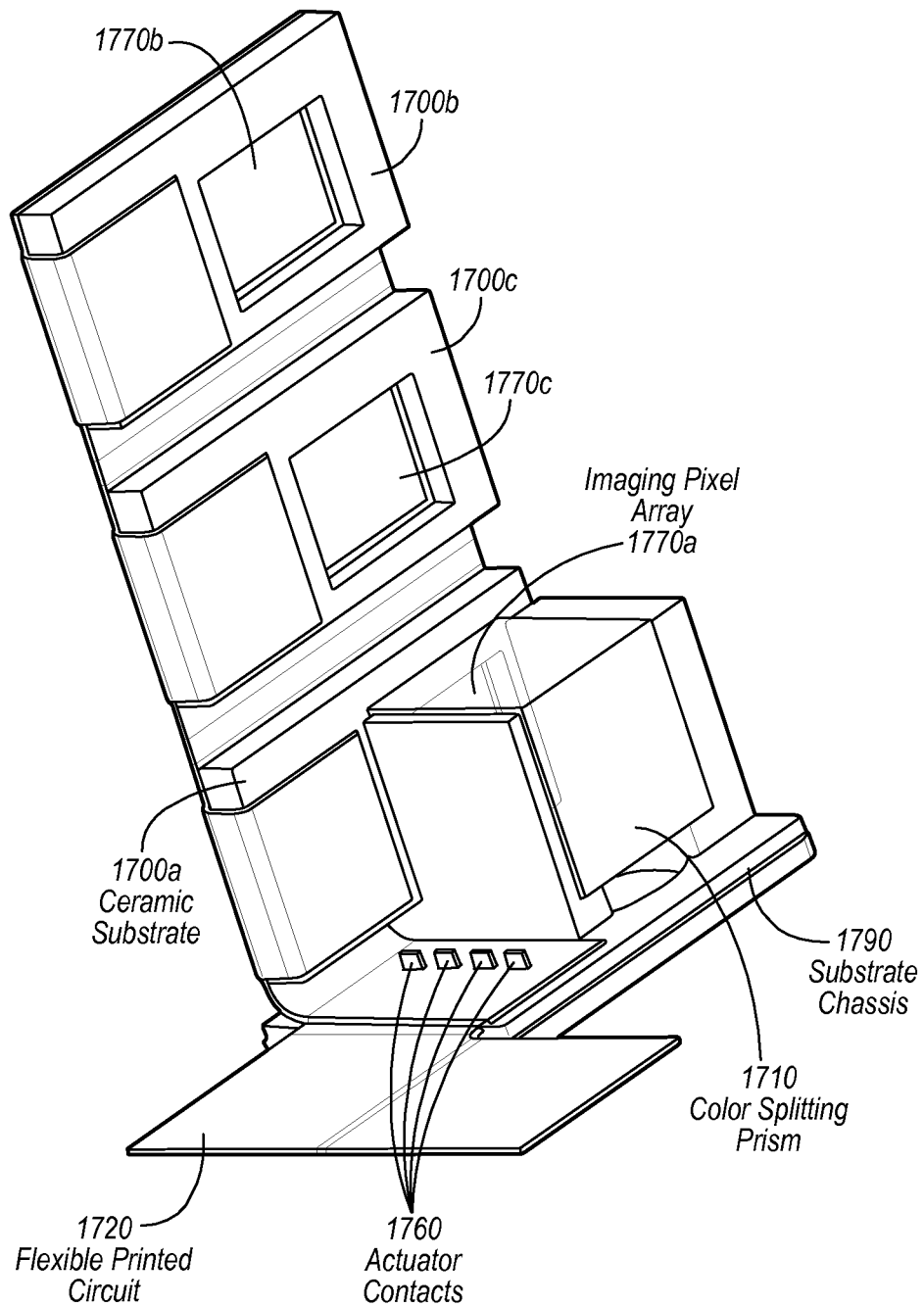
FIG. 17 illustrates articulation of a set of image sensor devices with a light splitting prism, a flexible printed circuit, and a substrate chassis for use in a camera for use in a portable multifunction device in accordance with some embodiments.

FIG. 17 illustrates articulation of a set of image sensor devices with a light splitting prism, a flexible printed circuit, and a substrate chassis for use in a camera for use in a portable multifunction device in accordance with some embodiments. Ceramic substrates 1700a-c are articulated to a flexible printed circuit 1720 to align image sensor device imaging pixel arrays 1770a-1770c pointed to a color-splitting prism 1710, using a substrate chassis 1790 carrying a set of actuator contacts 1760.

Figure 18:
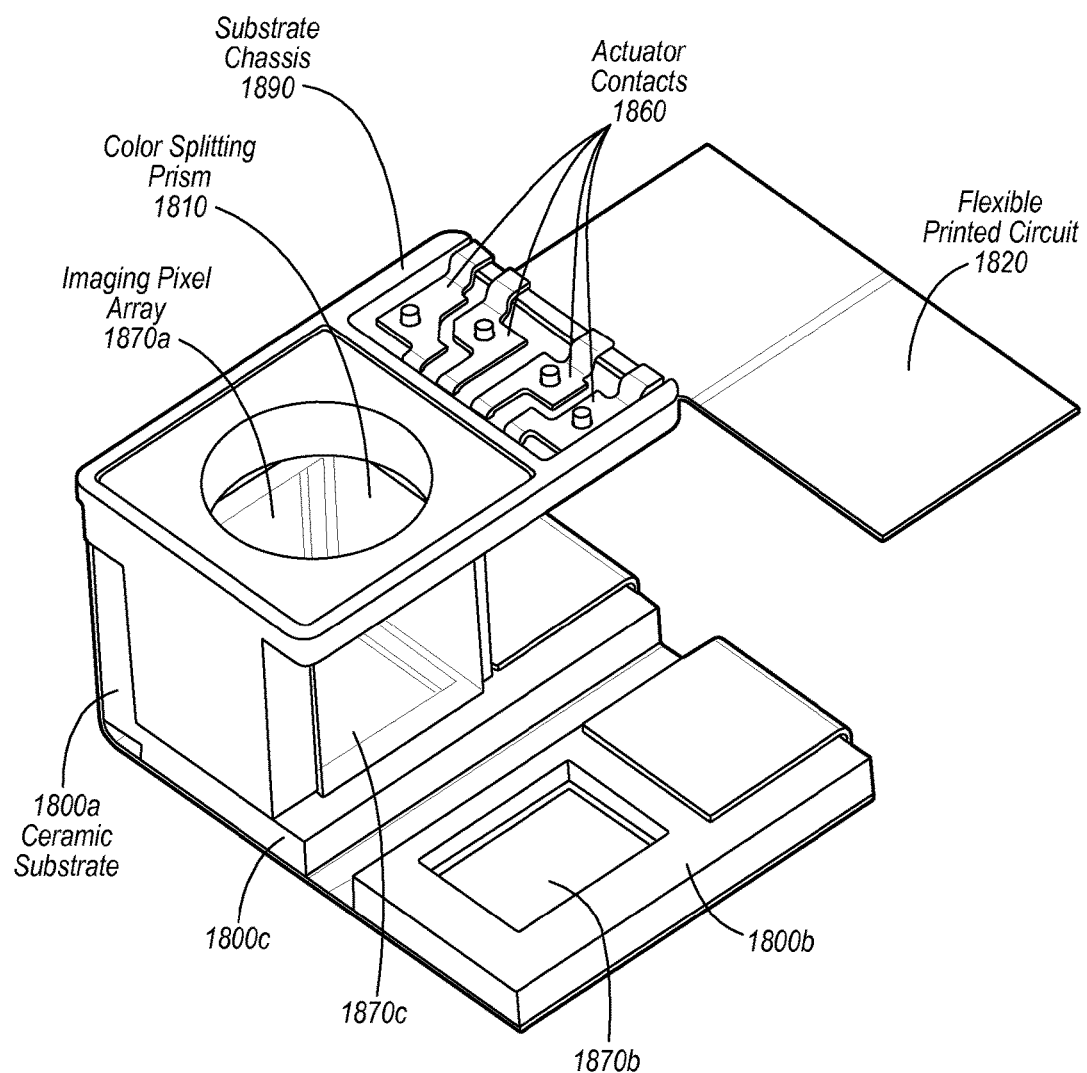
FIG. 18 depicts articulation of a set of image sensor devices with a light splitting prism, a flexible printed circuit, and a substrate chassis for use in a camera for use in a portable multifunction device in accordance with some embodiments.

FIG. 18 depicts articulation of a set of image sensor devices with a light splitting prism, a flexible printed circuit, and a substrate chassis for use in a camera for use in a portable multifunction device in accordance with some embodiments. Ceramic substrates 1800a-c are articulated to a flexible printed circuit 1820 to align image sensor device imaging pixel arrays 1870a-1870c pointed to a color-splitting prism 1810, using a substrate chassis 1890 carrying a set of actuator contacts 1860.

Figure 19:
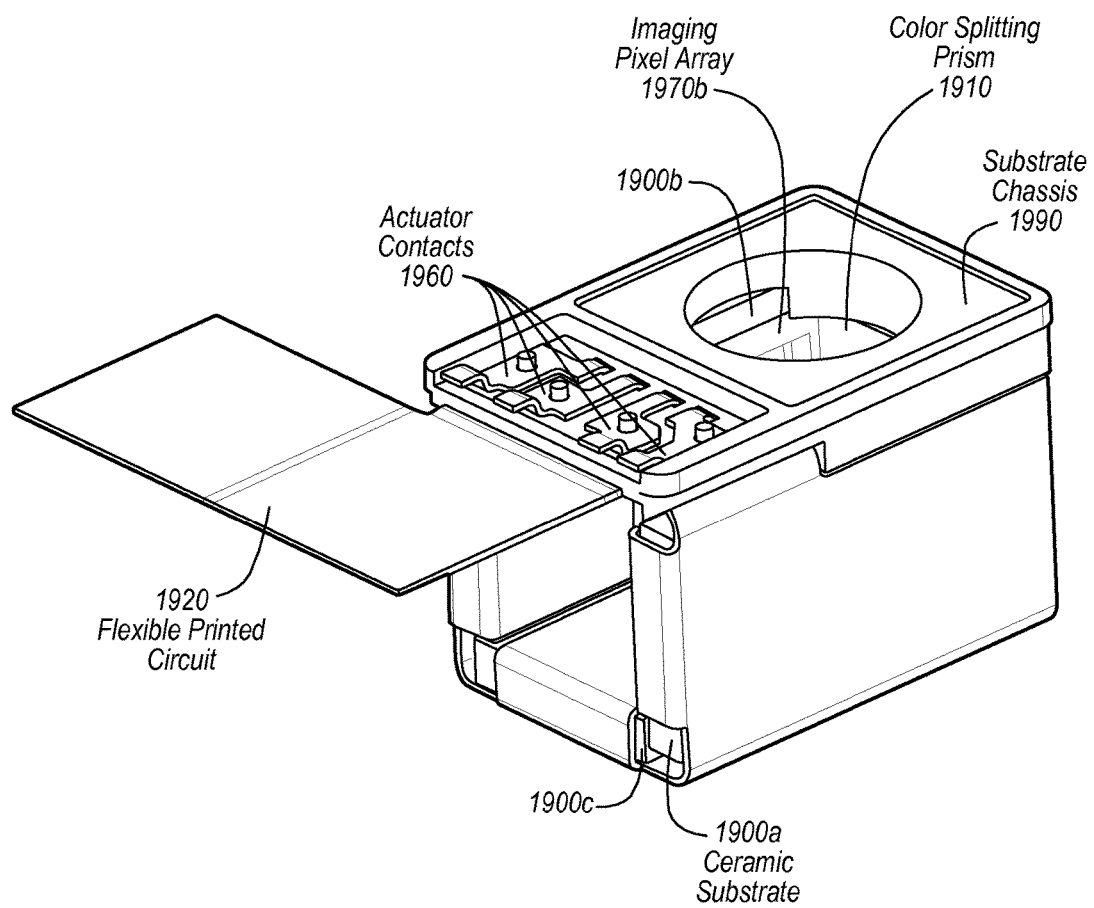
FIG. 19 illustrates articulation of a set of image sensor devices with a light splitting prism, a flexible printed circuit, and a substrate chassis for use in a camera for use in a portable multifunction device in accordance with some embodiments.

FIG. 19 illustrates articulation of a set of image sensor devices with a light splitting prism, a flexible printed circuit, and a substrate chassis for use in a camera for use in a portable multifunction device in accordance with some embodiments. Ceramic substrates 1900a-c are articulated to a flexible printed circuit 1920 to align image sensor device imaging pixel arrays (1900b visible) pointed to a color-splitting prism 1910, using a substrate chassis 1990 carrying a set of actuator contacts 1960.

Figure 20:
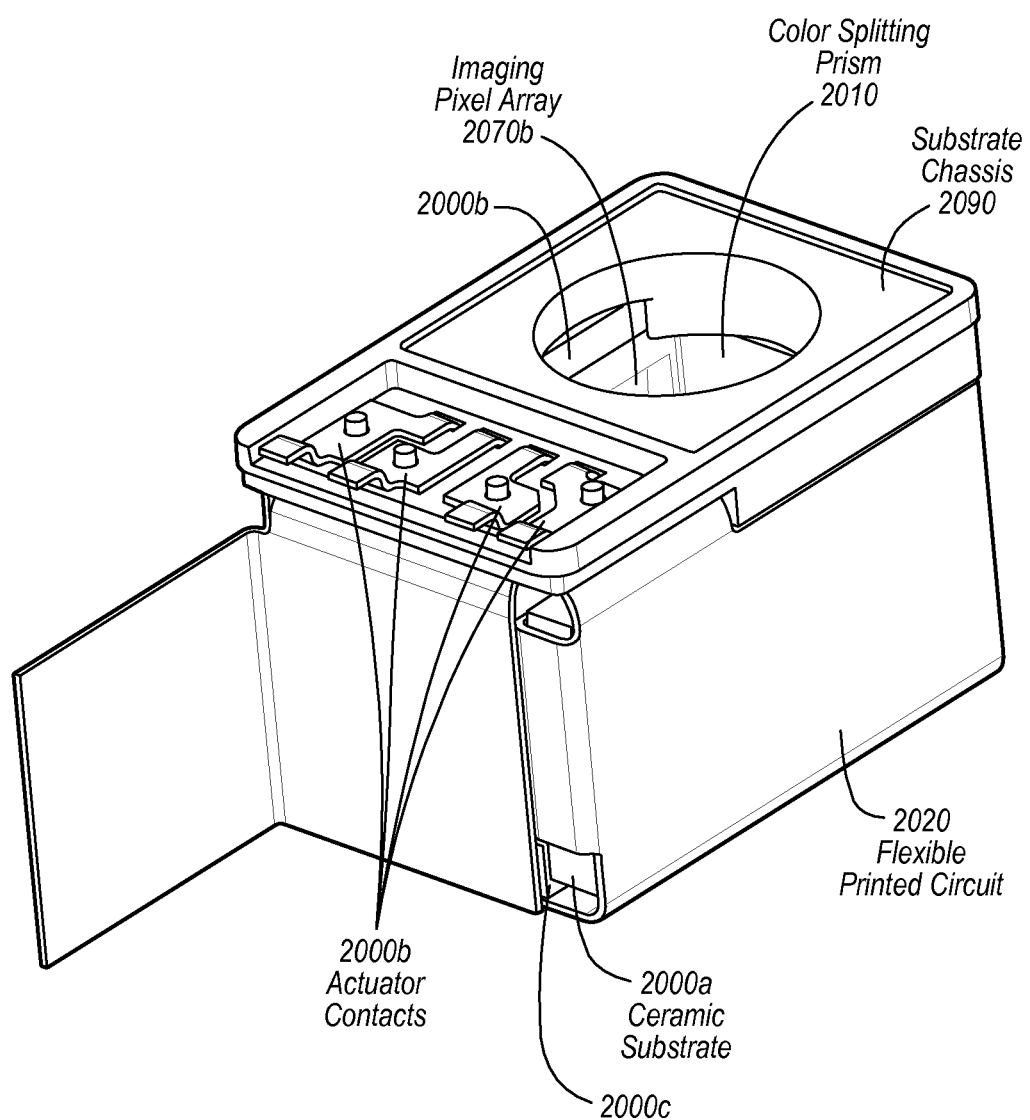
FIG. 20 depicts articulation of a set of image sensor devices with a light splitting prism, a flexible printed circuit, and a substrate chassis for use in a camera for use in a portable multifunction device in accordance with some embodiments.

FIG. 20 depicts articulation of a set of image sensor devices with a light splitting prism, a flexible printed circuit, and a substrate chassis for use in a camera for use in a portable multifunction device in accordance with some embodiments. Ceramic substrates 2000a-c are articulated to a flexible printed circuit 2020 to align image sensor device imaging pixel arrays (2070b visible) pointed to a color-splitting prism 2010, using a substrate chassis 2090 carrying a set of actuator contacts 2060.

Figure 21:
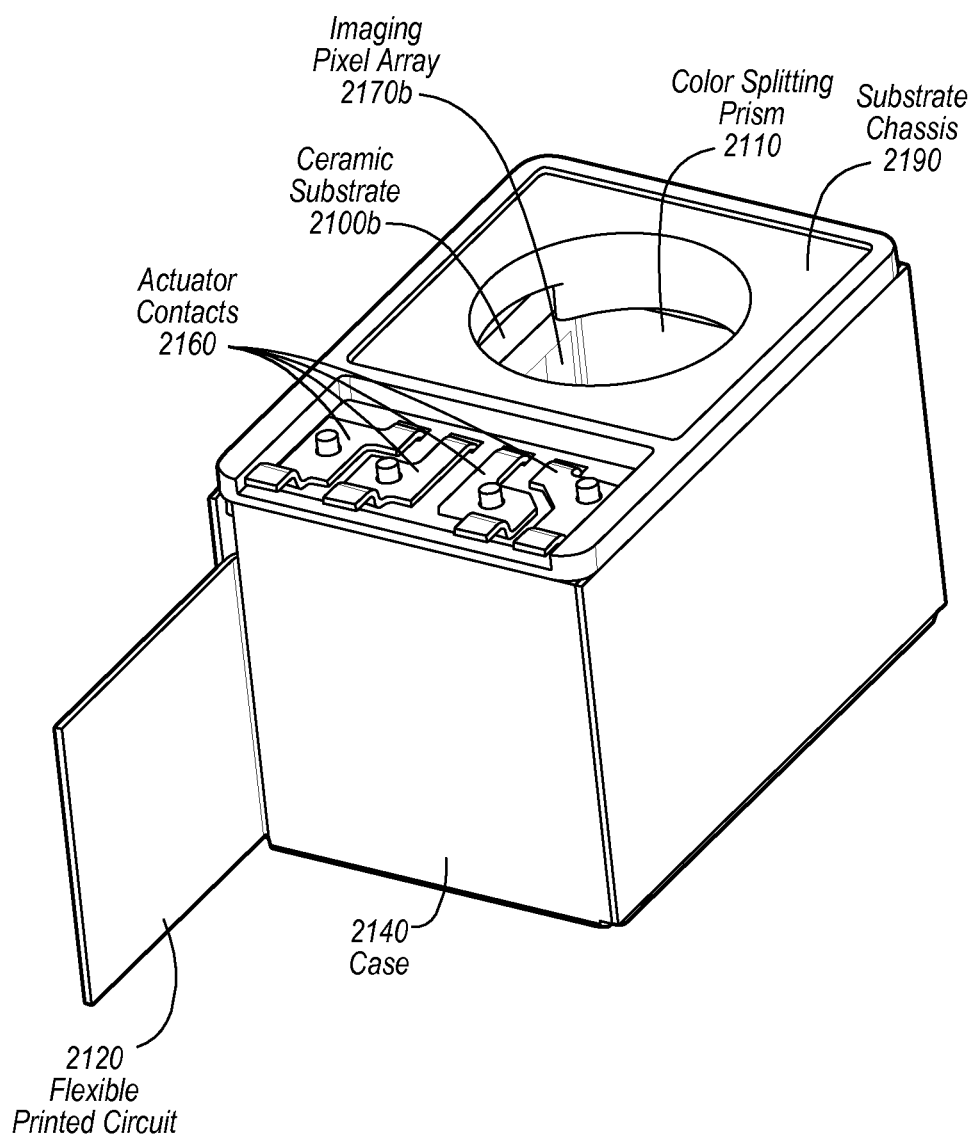
FIG. 21 illustrates articulation of a set of image sensor devices with a light splitting prism, a housing can, a flexible printed circuit, and a substrate chassis for use in a camera for use in a portable multifunction device in accordance with some embodiments.

FIG. 21 illustrates articulation of a set of image sensor devices with a light splitting prism, a housing can, a flexible printed circuit, and a substrate chassis for use in a camera for use in a portable multifunction device in accordance with some embodiments. Ceramic substrates (2100b visible) are articulated to a flexible printed circuit 2120 inside of a case 2140 to align image sensor device imaging pixel arrays (2170b visible) pointed to a color-splitting prism 2110, using a substrate chassis 2190 carrying a set of actuator contacts 2160.

Figure 22:
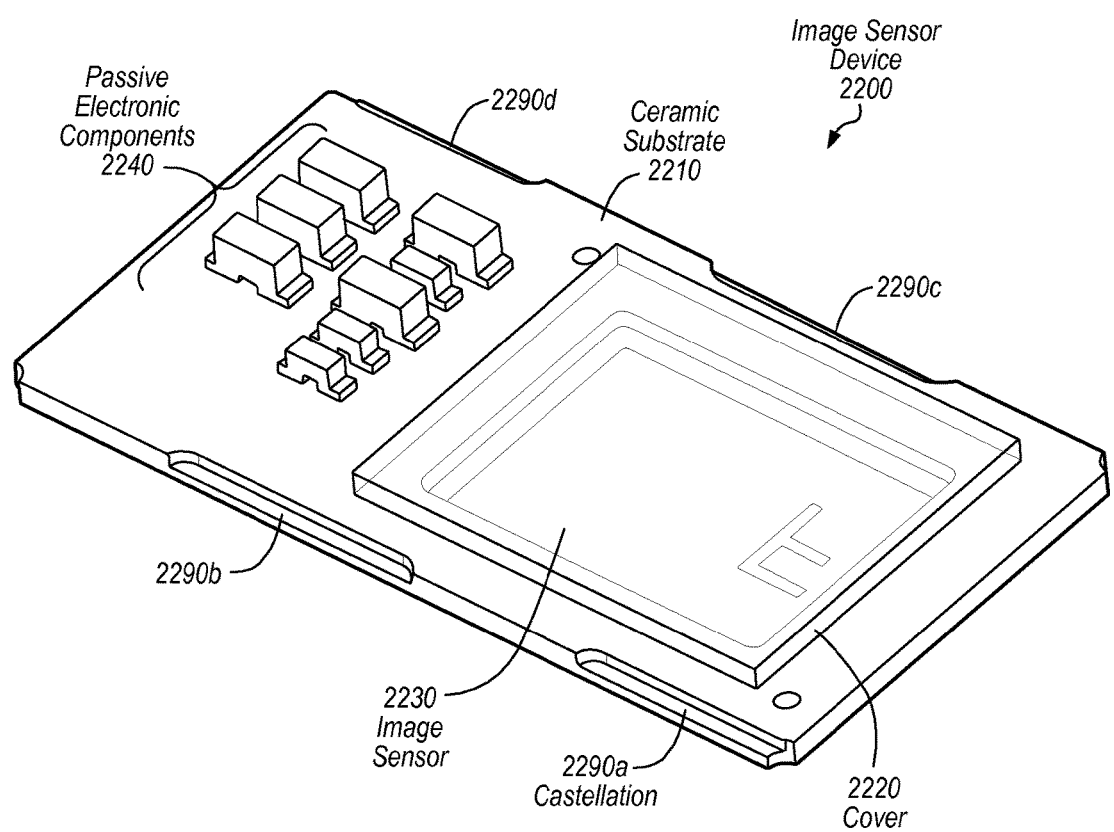
FIG. 22 depicts an image sensor device including a flip-chip image sensor bonded to a ceramic substrate for use in a camera for use in a portable multifunction device in accordance with some embodiments.

FIG. 22 depicts an image sensor device including a flip-chip image sensor bonded to a ceramic substrate for use in a camera for use in a portable multifunction device in accordance with some embodiments. An image sensor device 2200 includes a ceramic substrate 2210, with castellations 2290a-d, supporting a cover 2220 over an image sensor 2230. Passive electronic components 2240 are mounted on the ceramic substrate 2310.

Figure 23:
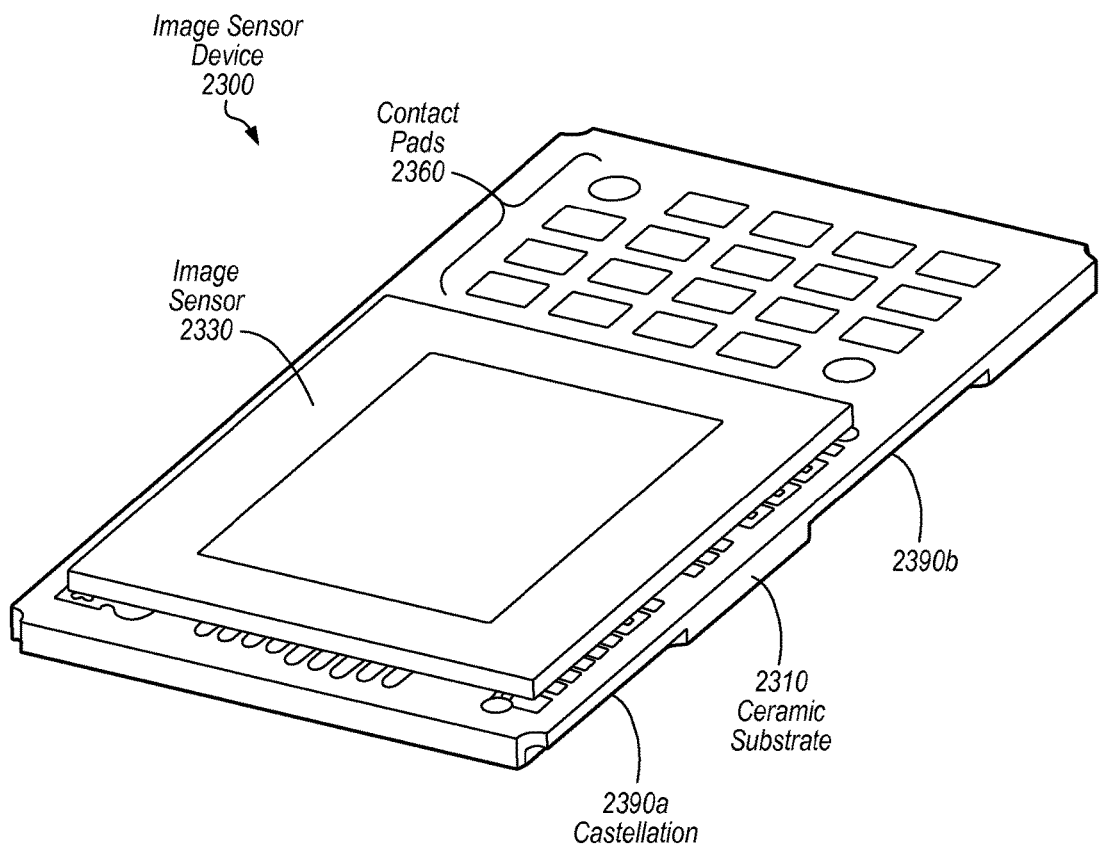
FIG. 23 illustrates an image sensor device including a flip-chip image sensor bonded to a ceramic substrate for use in a camera for use in a portable multifunction device in accordance with some embodiments.

FIG. 23 illustrates an image sensor device including a flip-chip image sensor bonded to a ceramic substrate for use in a camera for use in a portable multifunction device in accordance with some embodiments. An image sensor device 2300 includes a ceramic substrate 2310, with castellations 2390a-b, supporting an image sensor 2330. Contact pads 2360 are mounted on the ceramic substrate 2310.

Figure 24:
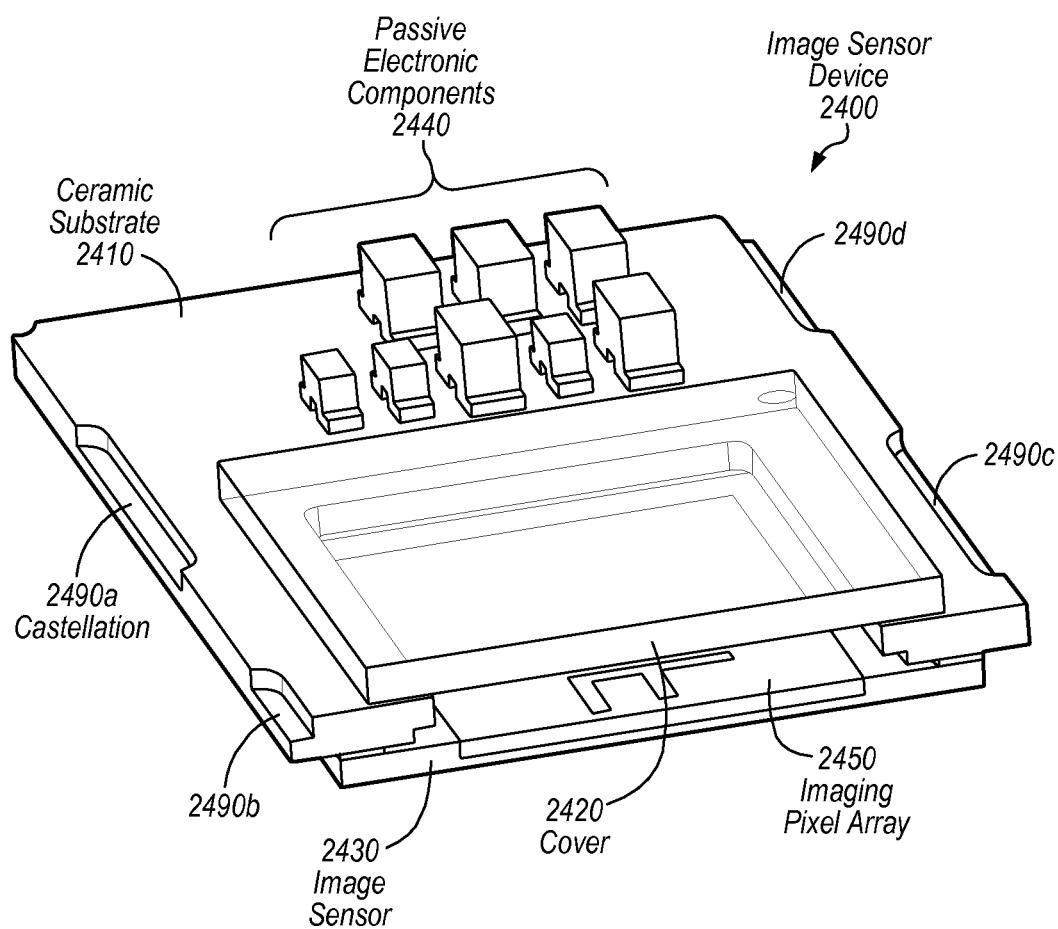
FIG. 24 depicts an image sensor device including a flip-chip image sensor bonded to a ceramic substrate for use in a camera for use in a portable multifunction device in accordance with some embodiments.

FIG. 24 depicts an image sensor device including a flip-chip image sensor bonded to a ceramic substrate for use in a camera for use in a portable multifunction device in accordance with some embodiments. An image sensor device 2400 includes a ceramic substrate 2410, with castellations 2490a-d, supporting an image sensor 2430 with an imaging pixel array 2450 under a cover 2420. Contact pads 2460 are mounted on the ceramic substrate 2410.

Figure 25:
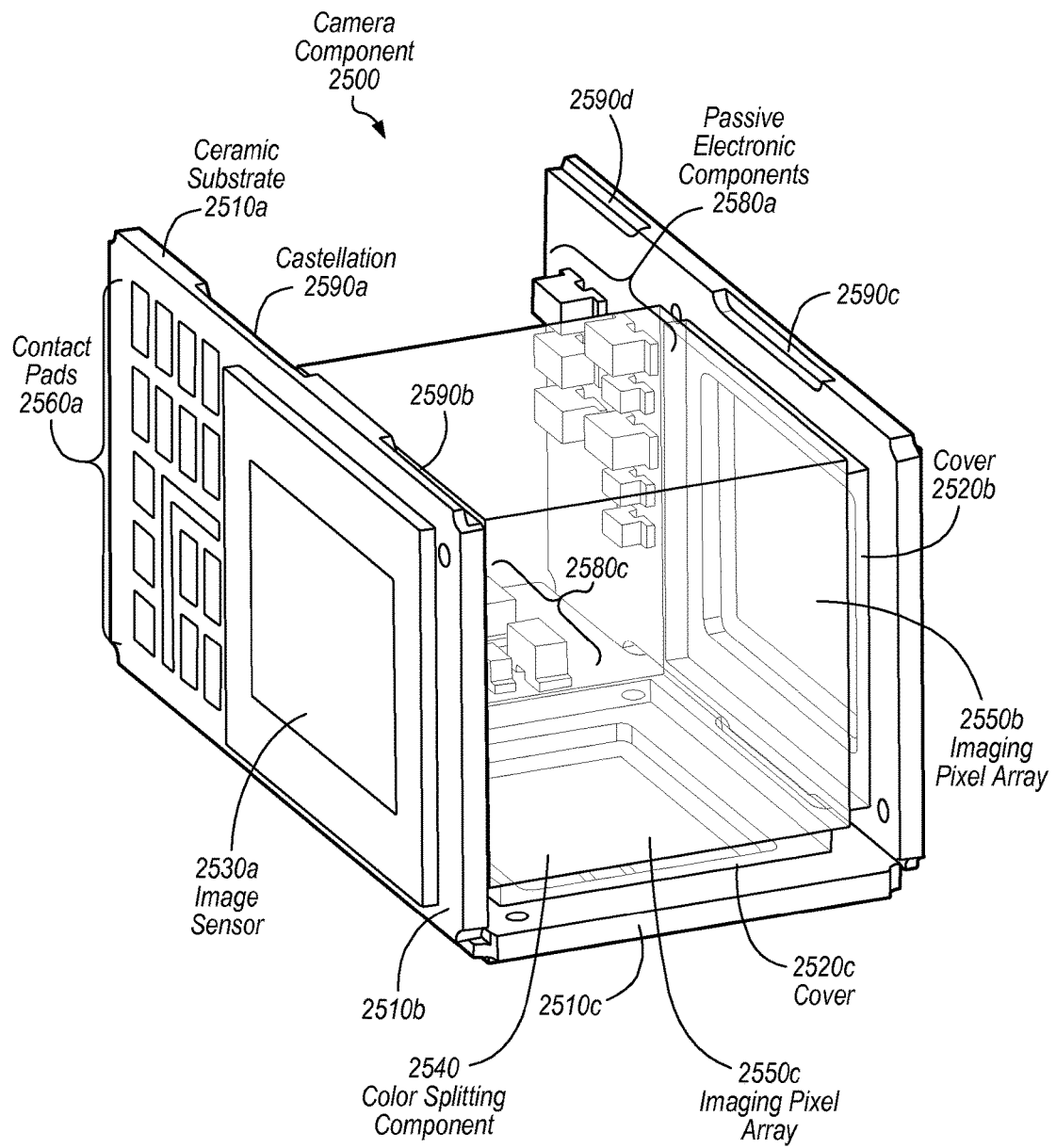
FIG. 25 illustrates articulation of a set of image sensor devices with a light splitting prism for use in a camera for use in a portable multifunction device in accordance with some embodiments.

FIG. 25 illustrates articulation of a set of image sensor devices with a light splitting prism for use in a camera for use in a portable multifunction device in accordance with some embodiments. A camera component 2500 includes ceramic substrates 2510a-c, with castellations 2590a-d, supporting image sensors (2530a visible) with imaging pixel arrays (2550b-c visible) pointed toward a color-splitting component 2540 under covers (2520b-c visible). Contact pads 2560a are mounted on the ceramic substrates 2510a-c, as are passive electronic components 2580a-c. Color splitting component 2540 is a cube with plural embedded surfaces that either reflect incoming light or allow it to pass across the surface depending in the wavelength of the light. In some configurations, two crossed planar surfaces internal to the cube are orthogonal to each other and both inclined at 45 degrees to the same four external faces of the cube. Both extend between diagonally opposite edges of the cube. One internal surface reflects longer wavelengths in the visible region (red), and the other reflects short wavelengths in the visible region (blue). Wavelengths towards the middle of the visible range (green) pass through both surfaces, nominally unchanged. Light passing through such a cube is shown in FIG. 26, which is discussed below.

The optical element (color splitting component 2540) that splits the light is a cuboid element, with a square crosssection. It is fabricated from four pieces with triangular cross-section that are bonded together so that interfaces between these four pieces extend diagonally across the corners of the square cross-section. At these interfaces, coatings are applied of the appropriate thickness and material such that the interface on one diagonal reflects light of a particular band of waves, say red light, whilst the orthogonal interface reflects light of a different range of wavelengths, say blue light. By both interfaces, light not in the appropriate range passes substantially unimpeded across the interface.

Three packaged images sensors (2530a visible) are mounted on three of the sides of the light splitting cuboid (color splitting component 2540). The color-splitting cuboid (color splitting component 2540) directs the red, green and blue light separately to the three image sensors. In some embodiments, each color is captured at the full resolution of the image sensor, and there are no color filters to reduce the efficiency of the captured light.

Figure 26:
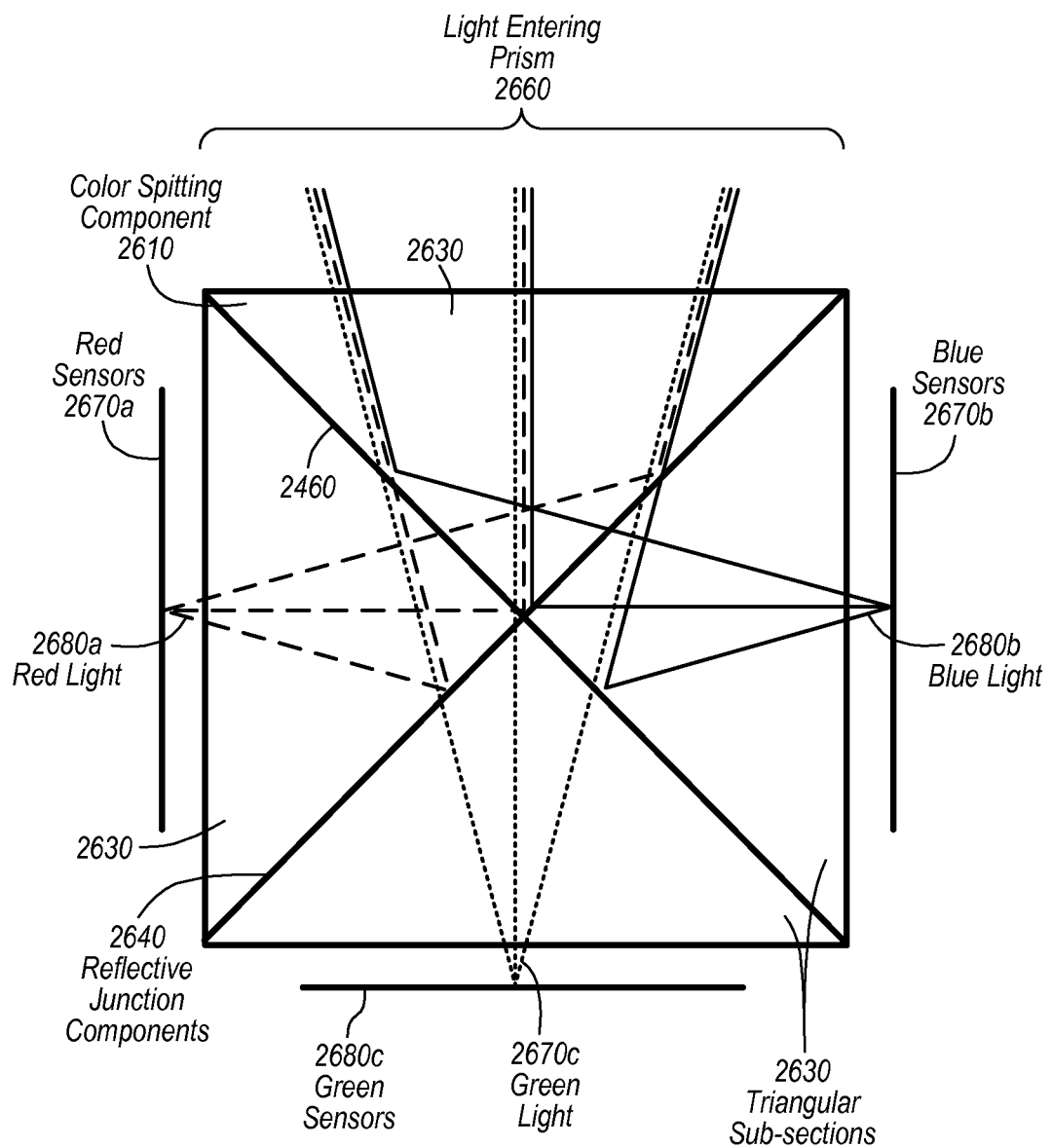
FIG. 26 depicts a ray trace of light through a light-splitting cube of camera for use in a portable multifunction device in accordance with some embodiments.

FIG. 26 depicts a ray trace of light through a light-splitting cube of camera for use in a portable multifunction device in accordance with some embodiments. A color-splitting component 2610 and red sensors 2670a, blue sensors 2670b and green sensors 2670c. Light entering color-splitting component 2660 is divided into blue light 2680b, which is sent to blue sensors 2670b, red light 2680a, which is sent to red sensors 2670a, and green light 2680c, which is sent to green sensors 2670c. Color-splitting component 2610 is built from triangular sub-sections 2630 that meet at selectively reflective junction components 2640. It may be appreciated based on the rays in FIG. 26 that an image sensor facing the top side of the cube (green sensors 2680c) would substantially receive green light 2670c only, an image sensor facing the left side of the cube (blue sensors 2670b) would substantially receive blue light 2680b only and an image sensor facing the right (red sensor 2670a) surface of the cube will substantially receive red light 2680a only.

Figure 27:
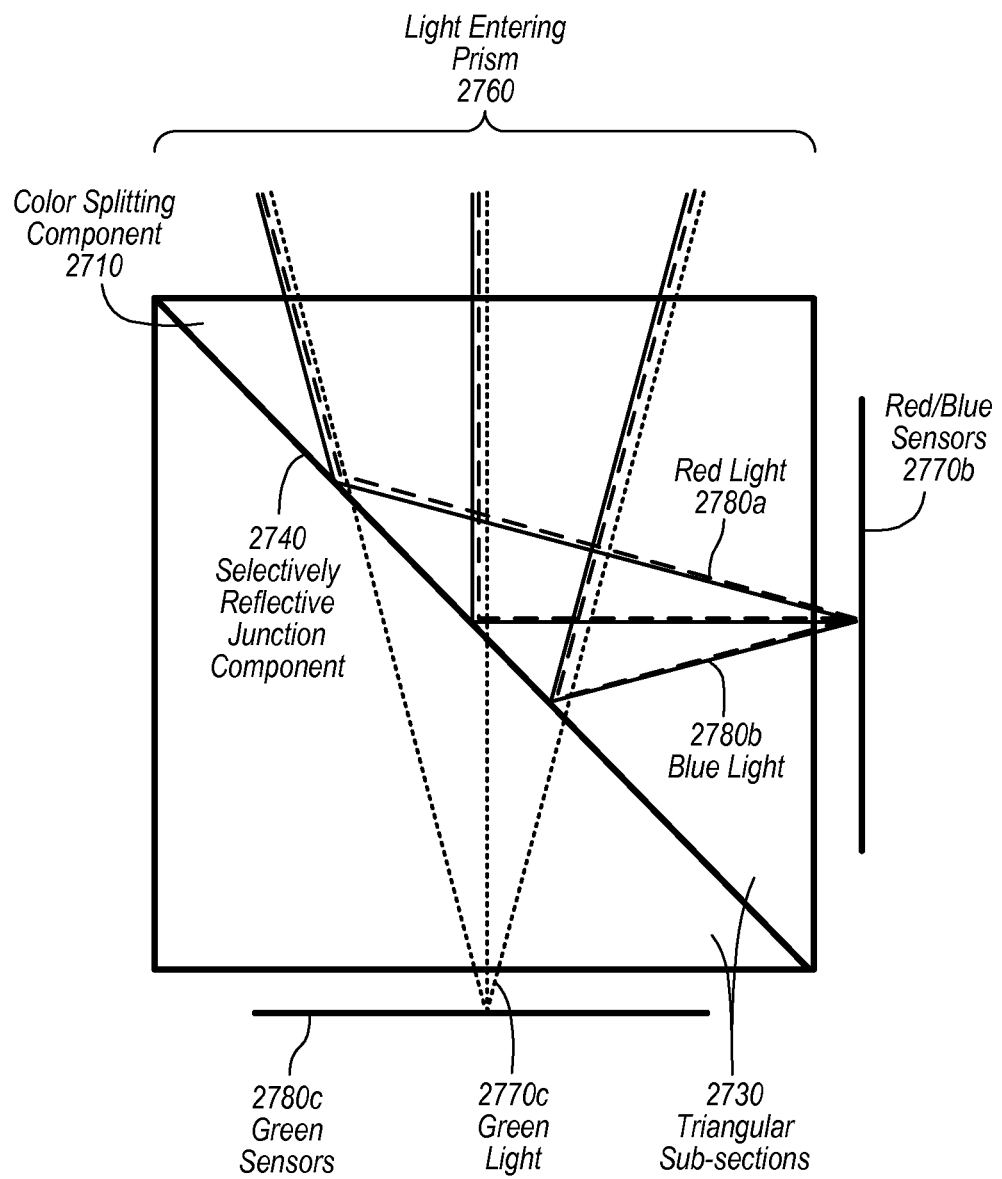
FIG. 27 illustrates a ray trace of light through a light-splitting cube of camera for use in a portable multifunction device in accordance with some embodiments.

FIG. 27 illustrates a ray trace of light through a light-splitting cube of camera for use in a portable multifunction device in accordance with some embodiments. A color-splitting component 2710 is arranged with red/blue sensors 2670b and green sensors 2770c. Light entering color-splitting component 2760 is divided into blue light 2680b, which is sent to red/blue sensors 2670b, red light 2680a, which is sent to red/blue sensors 2770b, and green light 2780c, which is sent to green sensors 2770c. Color-splitting component 2710 is built from triangular sub-sections 2730 that meet at selectively reflective junction component 2740.

Color-splitting component 2710 is a cuboid that is made up of two larger components of (triangular subsections 2730) and triangular cross-section and hence there is only one internal interface (selectively reflective junction component 2740) inside the colorsplitting cuboid (color-splitting component 2710). The coatings on this interface at selectively reflective junction component 2740 are arranged to reflect both red and blue light, whilst allowing green to pass through. A functionally equivalent embodiment is when the interface reflects green light, allowing red and blue to pass through substantially unaffected.

Figure 28:
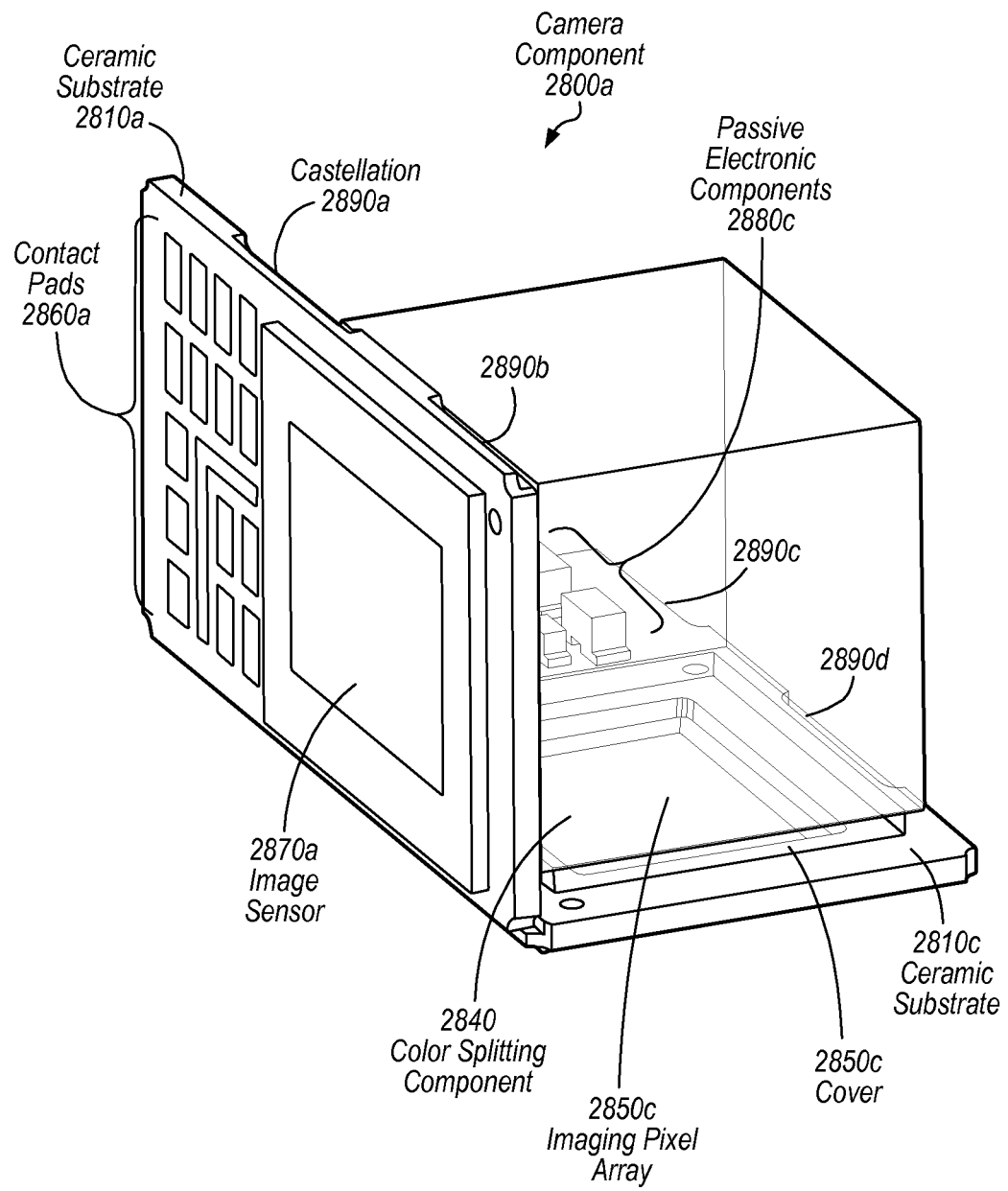
FIG. 28 depicts articulation of a set of image sensor devices with a light splitting prism for use in a camera for use in a portable multifunction device in accordance with some embodiments.

FIG. 28 depicts articulation of a set of image sensor devices with a light splitting prism for use in a camera for use in a portable multifunction device in accordance with some embodiments. A camera component 2800 includes ceramic substrates 2810a-c, with castellations 2890a-d, supporting image sensors (2870a visible) with imaging pixel arrays (2850c visible) pointed toward a color-splitting component 2840 under covers (2820c visible). Contact pads 2860a are mounted on the ceramic substrates 2810a-c, as are passive electronic components (2880c visible).

In the embodiment depicted in FIG. 28., three image sensors are replaced by two image sensors. One image sensor (2870a visible) has no color filter, and is positioned relative to the interfaces in the color-splitting cuboid (color-splitting component 2840) to accept green light. The second image sensor has a chequerboard pattern of blue and red color filters in cover 2850 over the pixel array. Such a pattern is illustrated in FIG. 30, discussed below.

Figure 29:
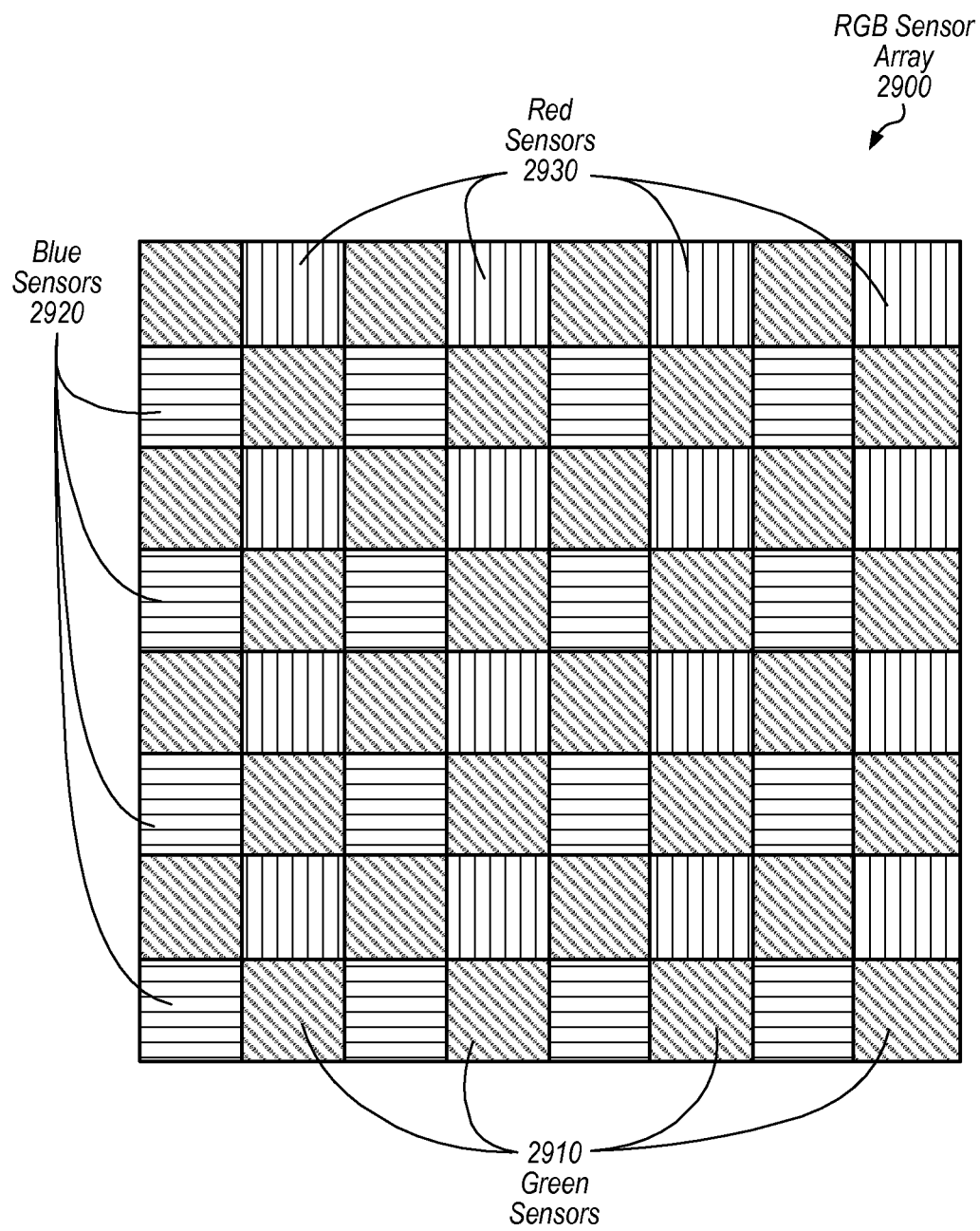
FIG. 29 illustrates an image sensor pixel array for use in a camera for use in a portable multifunction device in accordance with some embodiments.

FIG. 29 illustrates an image sensor pixel array for use in a camera for use in a portable multifunction device in accordance with some embodiments. An RGB sensor array 2900 is shown with green sensors 2910, red sensors 2930 and blue sensors 2920.

FIG. 30 depicts an image sensor pixel array for use in a camera for use in a portable multifunction device in accordance with some embodiments. An RB sensor array 3000 is shown with blue sensors 3020 and red sensors 3030.

Example Operations

Figure 31:
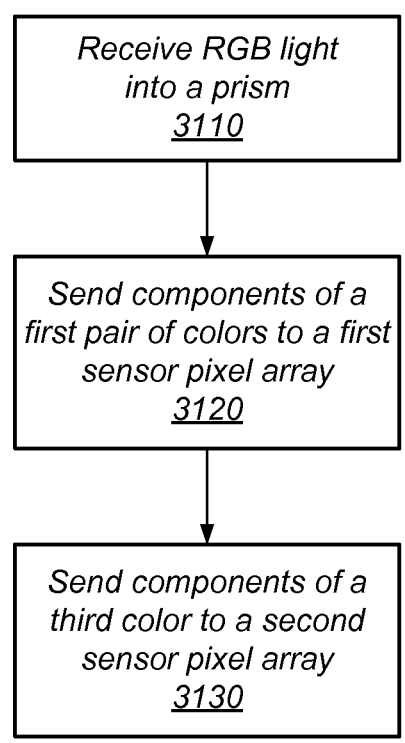
FIG. 31 is a flow diagram illustrating one embodiment of a method for capturing images using a set of image sensor devices with a light splitting prism according to some embodiments.

FIG. 31 is a flow diagram illustrating one embodiment of a method for capturing images using a set of image sensor devices with a light splitting prism according to some embodiments. RGB light is received into a prism (block 3110). Components in a first pair of colors are sent to a first pixel array (block 3120). Components in a third color are sent to a second pixel array.

Example Computer System

Figure 32:
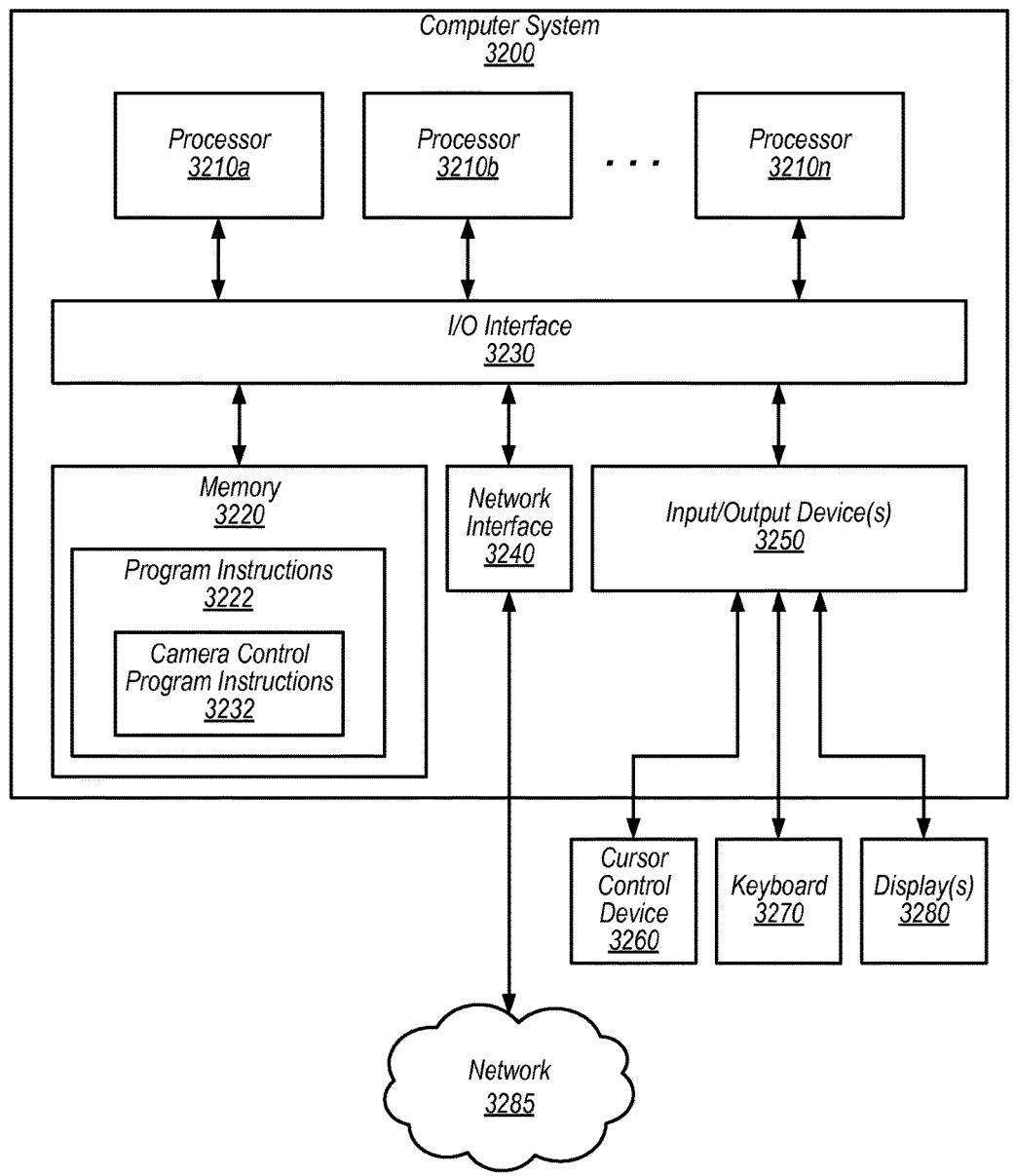
FIG. 32 illustrates an example computer system configured to implement aspects of the system and method for image capture.

FIG. 32 illustrates computer system 3200 that is configured to execute any or all of the embodiments described above. In different embodiments, computer system 3200 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 3200, which may interact with various other devices. Note that any component, action, or functionality described above with respect to FIGS. 1-5 may be implemented on one or more computers configured as computer system 3200 of FIG. 32, according to various embodiments. In the illustrated embodiment, computer system 3200 includes one or more processors 3210 coupled to a system memory 3220 via an input/output (I/O) interface 3230. Computer system 3200 further includes a network interface 3240 coupled to I/O interface 3230, and one or more input/output devices 3250, such as cursor control device 3260, keyboard 3270, and display(s) 3280. In some cases, it is contemplated that embodiments may be implemented using a single instance of computer system 3200, while in other embodiments multiple such systems, or multiple nodes making up computer system 3200, may be configured to host different portions or instances of embodiments. For example, in one embodiment some elements may be implemented via one or more nodes of computer system 3200 that are distinct from those nodes implementing other elements.

In various embodiments, computer system 3200 may be a uniprocessor system including one processor 3210, or a multiprocessor system including several processors 3210 (e.g., two, four, eight, or another suitable number). Processors 3210 may be any suitable processor capable of executing instructions. For example, in various embodiments processors 3210 may be general-purpose or embedded processors implementing any of a variety of instruction set architectures (ISAs), such as the x86, PowerPC, SPARC, or MIPS ISAs, or any other suitable ISA. In multiprocessor systems, each of processors 3210 may commonly, but not necessarily, implement the same ISA.

System memory 3220 may be configured to store program instructions 3222 and/or existing state information and ownership transition condition data 3232 accessible by processor 3210. In various embodiments, system memory 3220 may be implemented using any suitable memory technology, such as static random access memory (SRAM), synchronous dynamic RAM (SDRAM), nonvolatile/Flash-type memory, or any other type of memory. In the illustrated embodiment, program instructions 3222 may be configured to implement a mapping application 3224 incorporating any of the functionality described above. Additionally, existing state information and ownership transition condition data 3232 of memory 3220 may include any of the information or data structures described above. In some embodiments, program instructions and/or data may be received, sent or stored upon different types of computer-accessible media or on similar media separate from system memory 3220 or computer system 3200. While computer system 3200 is described as implementing the functionality of functional blocks of previous Figures, any of the functionality described herein may be implemented via such a computer system.

In one embodiment, I/O interface 3230 may be configured to coordinate I/O traffic between processor 3210, system memory 3220, and any peripheral devices in the device, including network interface 3240 or other peripheral interfaces, such as input/output devices 3250. In some embodiments, I/O interface 3230 may perform any necessary protocol, timing or other data transformations to convert data signals from one component (e.g., system memory 3220) into a format suitable for use by another component (e.g., processor 3210). In some embodiments, I/O interface 3230 may include support for devices attached through various types of peripheral buses, such as a variant of the Peripheral Component Interconnect (PCI) bus standard or the Universal Serial Bus (USB) standard, for example. In some embodiments, the function of I/O interface 3230 may be split into two or more separate components, such as a north bridge and a south bridge, for example. Also, in some embodiments some or all of the functionality of I/O interface 3230, such as an interface to system memory 3220, may be incorporated directly into processor 3210.

Network interface 3240 may be configured to allow data to be exchanged between computer system 3200 and other devices attached to a network 3285 (e.g., carrier or agent devices) or between nodes of computer system 3200. Network 3285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3250 may, in some embodiments, include one or more display terminals, keyboards, keypads, touchpads, scanning devices, voice or optical recognition devices, or any other devices suitable for entering or accessing data by one or more computer systems 3200. Multiple input/output devices 3250 may be present in computer system 3200 or may be distributed on various nodes of computer system 3200. In some embodiments, similar input/output devices may be separate from computer system 3200 and may interact with one or more nodes of computer system 3200 through a wired or wireless connection, such as over network interface 3240.

As shown in FIG. 32, memory 3220 may include program instructions 3222, which may be processor-executable to implement any element or action described above. In one embodiment, the program instructions may implement the methods described above, such as the methods illustrated by FIG. 8. In other embodiments, different elements and data may be included. Note that data 3232 may include any data or information described above.

Those skilled in the art will appreciate that computer system 3200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 3200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3200 may be transmitted to computer system 3200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A camera, comprising:
a first image sensor attached to a first ceramic substrate;
a second image sensor attached to a second ceramic substrate, wherein the second substrate is mounted at a right angle to the first substrate;
first and second pluralities of electrical connection pads for connecting respective ones of the first and second ceramic substrates to respective flexible printed circuits, wherein the first and second pluralities of electrical connection pads are located on a same side of an edge of the respective image sensors;
a lens system comprising a plurality of lens elements serving both the first image sensor and the second image sensor; and
a color-splitting component along an optical path between the lens system and the image sensors, wherein
the color-splitting component separates the light into a first set of wavelengths directed along a first path to the first image sensor and a second set of wavelengths directed along a second path to the second image sensor, and
the first path lies at a right angle to the second path.

2. The camera of claim 1, wherein
the first set of wavelengths comprises a first range of wavelengths, and
the second set of wavelengths comprises a second range of wavelengths above the first range of wavelengths and a third range of wavelengths below the first range of wavelengths.

3. The camera of claim 2, further comprising:
a color filter affixed between the second image sensor and the color splitting component.

4. The camera of claim 3, wherein the color filter comprises a checkerboard pattern of red and blue color filter elements over a pixel sensor array of the image sensor.

5. The camera of claim 1, wherein,
the color-splitting component comprises
a first optically transparent component bonded to a first surface of a selectively-reflective component, and
a second optically transparent component bonded to a second surface of the selectively-reflective film opposite the first surface of the selectively reflective component; and
the selectively-reflective component reflects or transmits light depending on the wavelength of the light.

6. The camera of claim 5, wherein
the color-splitting component has a rectangular cross-section;
the first optically transparent component has a triangular cross-section; and
the second optically transparent component has a triangular cross-section.

7. The camera of claim 1, wherein
the first set of wavelengths comprises a first range of green wavelengths, and
the second set of wavelengths comprises a second range of red wavelengths above the first range of wavelengths and a third range of blue wavelengths below the first range of wavelengths.

8. A camera component, comprising:
a first ceramic substrate;
a second ceramic substrate, wherein the second substrate is mounted at a right angle to the first substrate;
a first image sensor flip-chip bonded to the first ceramic substrate;
a second image sensor flip-chip bonded to the second ceramic substrate; and
first and second pluralities of electrical connection pads for connecting respective ones of the image sensor flip-chips to respective flexible printed circuits, wherein
the first and second pluralities of connection pads are respectively located on a first planar external surface of the first and second ceramic substrates, and
the first and second pluralities of connection pads are located on a same side of an edge of the respective image sensors.

9. The camera component of claim 8, wherein a plurality of bonding pads for flip-chip bonding the first image sensor to the first ceramic substrate is located on the first planar external surface of the first ceramic substrate.

10. The camera component of claim 8, wherein the first ceramic substrate has one or more castellations cut into two opposite sides of a second planar external surface of the first ceramic substrate.

11. The camera component of claim 8, wherein the first ceramic substrate has one or more castellations cut into two opposite sides of a second planar external surface of the first ceramic substrate, and the second planar external surface of the first ceramic substrate is on an opposite side of the first ceramic substrate from the first planar external surface of the first ceramic substrate.

12. The camera component of claim 8, wherein the first ceramic substrate has a plurality of castellations cut into two opposite sides of a second planar external surface of the first ceramic substrate, and each castellation of the plurality of castellations is offset from another of the plurality of castellations so that the second ceramic substrate mounted orthogonally to the first ceramic substrate in alignment with a color-splitting component can articulate to lock in place relative to one another and the color-splitting component.

13. The camera component of claim 8, wherein the first ceramic substrate has a plurality of castellations cut into two opposite sides of a second planar external surface of the first ceramic substrate, and each castellation of the plurality of castellations is offset from another of the plurality of castellations.

14. The camera component of claim 8, further comprising:
a lens system comprising a plurality of lens elements serving both the first image sensor and the second image sensor; and
a color-splitting component along an optical path between the lens system and the image sensors, wherein
the color-splitting component separates the light into a first set of wavelengths directed to the first image sensor and a second set of wavelengths directed to the second image sensor.

15. A camera component, comprising:
a first image sensor attached to a first ceramic substrate;
a second image sensor attached to a second ceramic substrate, wherein the second substrate is mounted at a right angle to the first substrate;
first and second pluralities of electrical connection pads for connecting respective ones of the first and second ceramic substrates to respective flexible printed circuits, wherein the first and second pluralities of electrical connection pads are located on a same side of an edge of the respective image sensors; and
a color-splitting component along an optical path between a lens system and the image sensors, wherein
the color-splitting component separates the light into a first set of wavelengths directed along a first path to the first image sensor and a second set of wavelengths directed along a second path to the second image sensor, and
the first path lies at a right angle to the second path.

16. The camera component of claim 15, wherein
the first set of wavelengths comprises a first range of wavelengths, and
the second set of wavelengths comprises a second range of wavelengths above the first range of wavelengths and a third range of wavelengths below the first range of wavelengths.

17. The camera component of claim 15, wherein
the first and second pluralities of electrical connection pads are located on a first planar external surface of the first and second ceramic substrates.

18. The camera component of claim 15, wherein a plurality of bonding pads for flip-chip bonding the image sensor to the first ceramic substrate is located on the first planar external surface of the first ceramic substrate.

19. The camera component of claim 15, wherein the first ceramic substrate has a plurality of castellations cut into two opposite sides of a second planar external surface of the first ceramic substrate, and each castellation of the plurality of castellations is offset from another of the plurality of castellations so that the second similar ceramic substrate mounted orthogonally to the ceramic substrate in alignment with a color-splitting component can articulate to lock in place relative to one another and the color-splitting component.

20. The camera component of claim 15, further comprising:
a lens system comprising a plurality of lens elements serving both the first image sensor and a second image sensor.

* * * * *